(12) United States Patent
Kozuka et al.

(10) Patent No.: US 10,282,634 B2
(45) Date of Patent: May 7, 2019

(54) IMAGE PROCESSING METHOD, IMAGE PROCESSING APPARATUS, AND RECORDING MEDIUM FOR REDUCING VARIATION IN QUALITY OF TRAINING DATA ITEMS

(71) Applicant: Panasonic Intellectual Property Corporation of America, Torrance, CA (US)

(72) Inventors: Kazuki Kozuka, Osaka (JP); Toru Tanigawa, Osaka (JP); Masahiko Saito, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 134 days.

(21) Appl. No.: 15/450,383

(22) Filed: Mar. 6, 2017

(65) Prior Publication Data
US 2017/0262728 A1    Sep. 14, 2017

Related U.S. Application Data

(60) Provisional application No. 62/306,939, filed on Mar. 11, 2016.

(30) Foreign Application Priority Data

Oct. 4, 2016    (JP) ................................. 2016-196795

(51) Int. Cl.
G06K 9/00    (2006.01)
G06K 9/46    (2006.01)
(Continued)

(52) U.S. Cl.
CPC ....... G06K 9/4604 (2013.01); G06K 9/00362 (2013.01); G06K 9/00805 (2013.01);
(Continued)

(58) Field of Classification Search
CPC .......... G06K 9/00805; G06K 9/00362; G06K 2009/00738; G06K 9/00369;
(Continued)

(56) References Cited

U.S. PATENT DOCUMENTS 6,035,053 A * 3/2000 Yoshioka ........... B60K 31/0008
340/435
8,954,252 B1 * 2/2015 Urmson ................. G08G 1/166
180/167
(Continued)

FOREIGN PATENT DOCUMENTS

JP    2013-197785    9/2013

OTHER PUBLICATIONS

The Extended European Search Report dated Jul. 12, 2017 for the related European Patent Application No. 17159478.1.
(Continued)

*Primary Examiner* — Li Liu
(74) *Attorney, Agent, or Firm* — Greenblum & Bernstein, P.L.C.

(57) ABSTRACT

An image processing method includes acquiring consecutive time-series images captured by an onboard camera of a vehicle, having a first annotation indicating two or more first regions, and at least including one or more images in which the two or more first regions are on a path of the vehicle and a distance therebetween is smaller than or equal to a threshold; determining, in reverse chronological order from an image of the last time point, positions of the two or more regions in each consecutive time-series image; identifying, from among the consecutive time-series images, the first image of a first time point in which none of the two or more first regions are located on the path, and setting, as a second region, a region between the two or more first regions in the identified first image; and attaching a second annotation to
(Continued)

the first image corresponding to the first time point, the second annotation indicating the second region.

14 Claims, 19 Drawing Sheets

(51) Int. Cl.
*G06T 11/60* (2006.01)
*G08G 1/04* (2006.01)
*G08G 1/16* (2006.01)
*H04N 7/18* (2006.01)
*G06K 9/32* (2006.01)

(52) U.S. Cl.
CPC .......... *G06K 9/3233* (2013.01); *G06T 11/60* (2013.01); *G08G 1/04* (2013.01); *G08G 1/166* (2013.01); *H04N 7/183* (2013.01); *G06K 2009/00738* (2013.01); *G06K 2009/3291* (2013.01)

(58) Field of Classification Search
CPC .... G06K 9/00624; G08G 1/166; G08G 1/163; G06T 2207/30261; G06T 2207/10016; G06T 2207/30196
See application file for complete search history.

(56) References Cited

U.S. PATENT DOCUMENTS

| | | | |
|---|---|---|---|
| 9,487,195 B2* | 11/2016 | Fujishiro | B60W 10/18 |
| 9,711,049 B2* | 7/2017 | Baba | G08G 1/166 |
| 9,908,469 B2* | 3/2018 | Akiyama | B60Q 9/008 |
| 9,925,939 B2* | 3/2018 | Rosenbaum | B60R 21/013 |
| 9,925,979 B2* | 3/2018 | Deshpande | B60W 30/09 |
| 9,925,980 B2* | 3/2018 | Edo-Ros | B60W 30/0956 |
| 10,210,399 B2* | 2/2019 | Sabeti | G06K 9/00791 |
| 2013/0223686 A1* | 8/2013 | Shimizu | G08G 1/166 382/103 |
| 2013/0242127 A1 | 9/2013 | Kasahara et al. | |
| 2014/0062685 A1* | 3/2014 | Tamatsu | B60Q 5/005 340/425.5 |
| 2014/0343749 A1* | 11/2014 | Minemura | B60W 30/0953 701/1 |
| 2017/0124788 A1* | 5/2017 | Nishida | G07C 5/0866 |
| 2017/0232964 A1* | 8/2017 | Moritani | B60T 7/22 701/70 |
| 2017/0243083 A1* | 8/2017 | Wang | G06K 9/00711 |

OTHER PUBLICATIONS

Bonnin Sarah et al: "Pedestrian crossing prediction using multiple context-based models", 17th International IEEE Conference on Intelligent Transportation Systems (ITSC), IEEE, Oct. 8, 2014 (Oct. 8, 2014), pp. 378-385, XP032685540.

\* cited by examiner

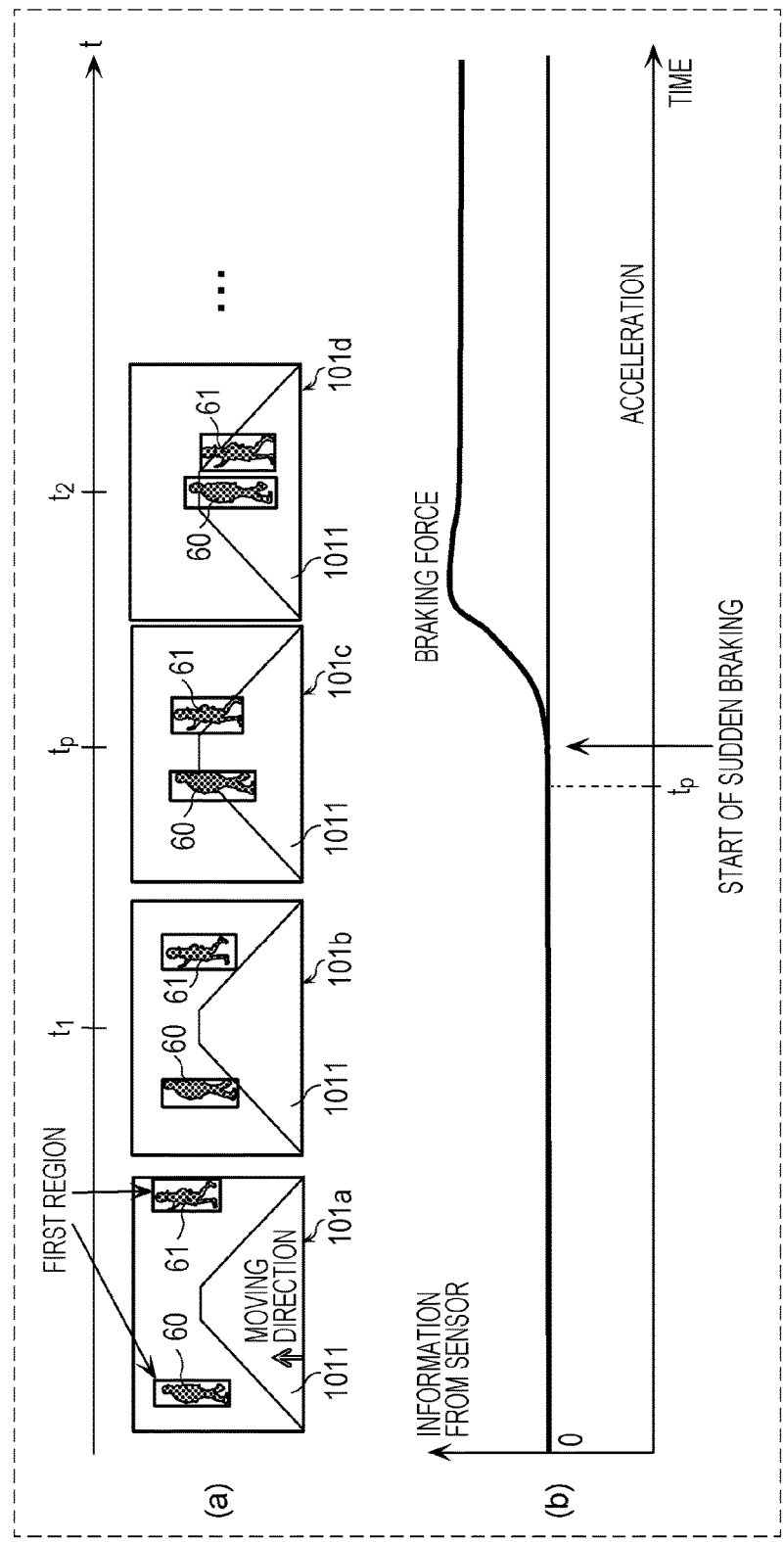

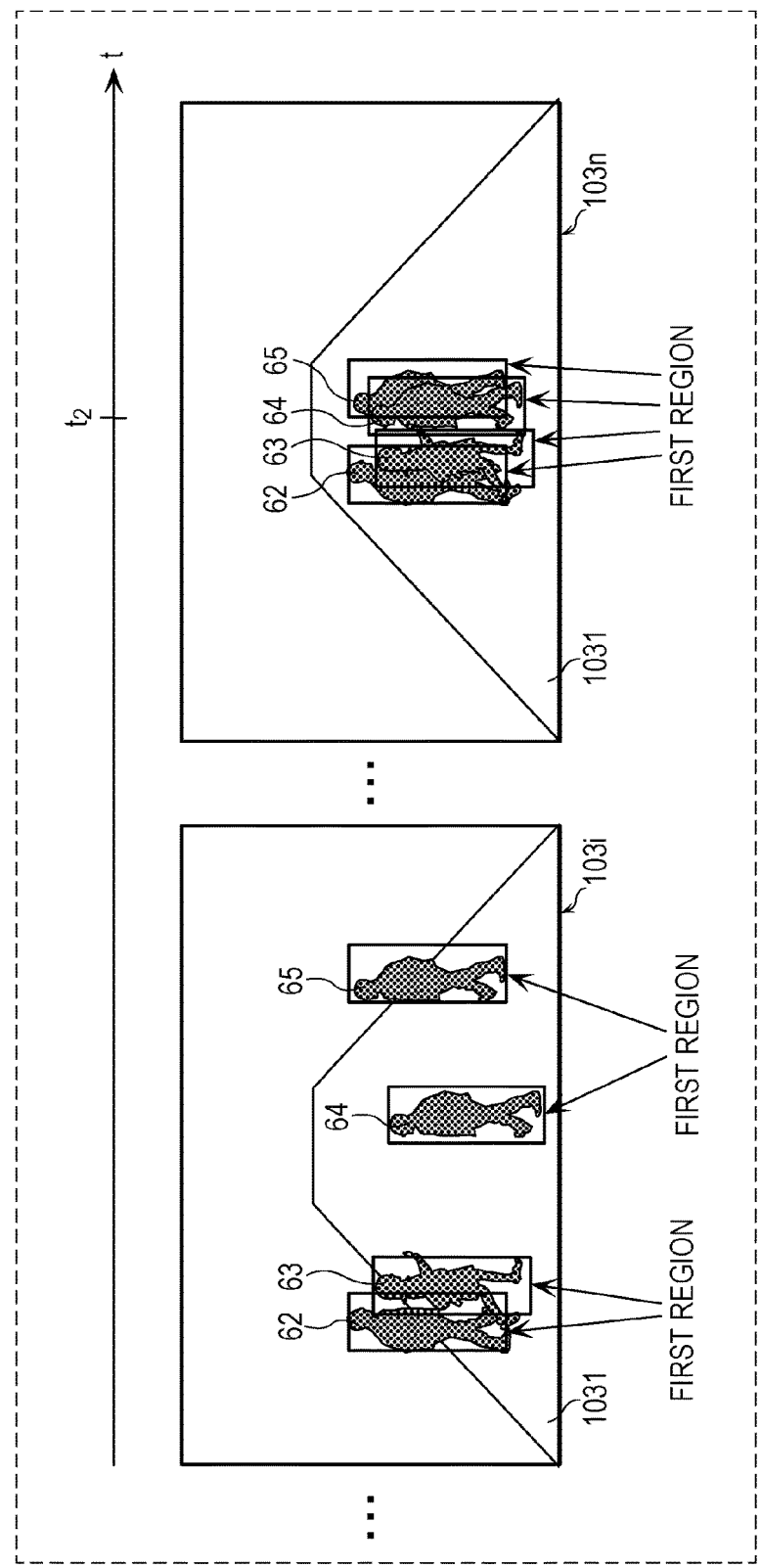

IMAGE PROCESSING METHOD, IMAGE PROCESSING APPARATUS, AND RECORDING MEDIUM FOR REDUCING VARIATION IN QUALITY OF TRAINING DATA ITEMS

BACKGROUND

1. Technical Field

The present disclosure relates to an image processing method, an image processing apparatus, and a recording medium.

2. Description of the Related Art

Recently, generic object recognition using neural-network-based machine learning technologies has achieved high performance and has been attracting attention.

However, in order to achieve high recognition performance by using neural-network-based generic object recognition, a learning process needs to be performed by using an enormous number of images to which information, such as the name and type of each recognition-target object, is attached as annotations (correct information).

It is also known that the accuracy increases in machine learning if large amounts of data (big data) are provided as training data.

A method for collecting big data is the use of outsourcing to a third party, such as crowdsourcing. Crowdsourcing is a mechanism for outsourcing a simple task to many unspecified individuals (workers) via the Internet at a low cost. Since the task for individual data items that constitute big data can be outsourced to many workers in a distributed manner if crowdsourcing is used to collect big data, the big data can be collected efficiently (at a relatively low cost in a relatively short period).

For example, Japanese Unexamined Patent Application Publication No. 2013-197785 discloses a technique for implementing crowdsourcing with a smaller number of people at high operation accuracy.

SUMMARY

In one general aspect, the techniques disclosed here feature an image processing method including acquiring a plurality of consecutive time-series images that have been captured by an onboard camera mounted on a vehicle and to which a first annotation indicating two or more first regions is attached, the two or more first regions including at least one person region, the plurality of consecutive time-series images at least including one or more images in which the two or more first regions are located on a path of the vehicle and a distance between the two or more first regions is smaller than or equal to a threshold; determining, in reverse chronological order from an image corresponding to the last time point in the time series, a position of each of the two or more regions in each of the plurality of consecutive time-series images acquired in the acquiring; identifying, from among the plurality of consecutive time-series images, a first image corresponding to a first time point for which it has been determined for the first time in the determining that none of the two or more first regions are located on the path, and setting, as a second region, a region between the two or more first regions in the identified first image; and attaching a second annotation to the first image corresponding to the first time point, the second annotation indicating the second region set in the setting.

According to the aspect of the present disclosure, an image processing method and the like capable of reducing the variation in the quality of training data items can be implemented.

It should be noted that general or specific embodiments may be implemented as a system, a method, an integrated circuit, a computer program, a computer-readable recording medium such as a compact disc-read only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is an explanatory diagram of advantageous effects provided by the first embodiment;

FIG. 12 is a diagram depicting an example of a plurality of images acquired by the annotating unit in a second modification;

DETAILED DESCRIPTION

Figure 1:
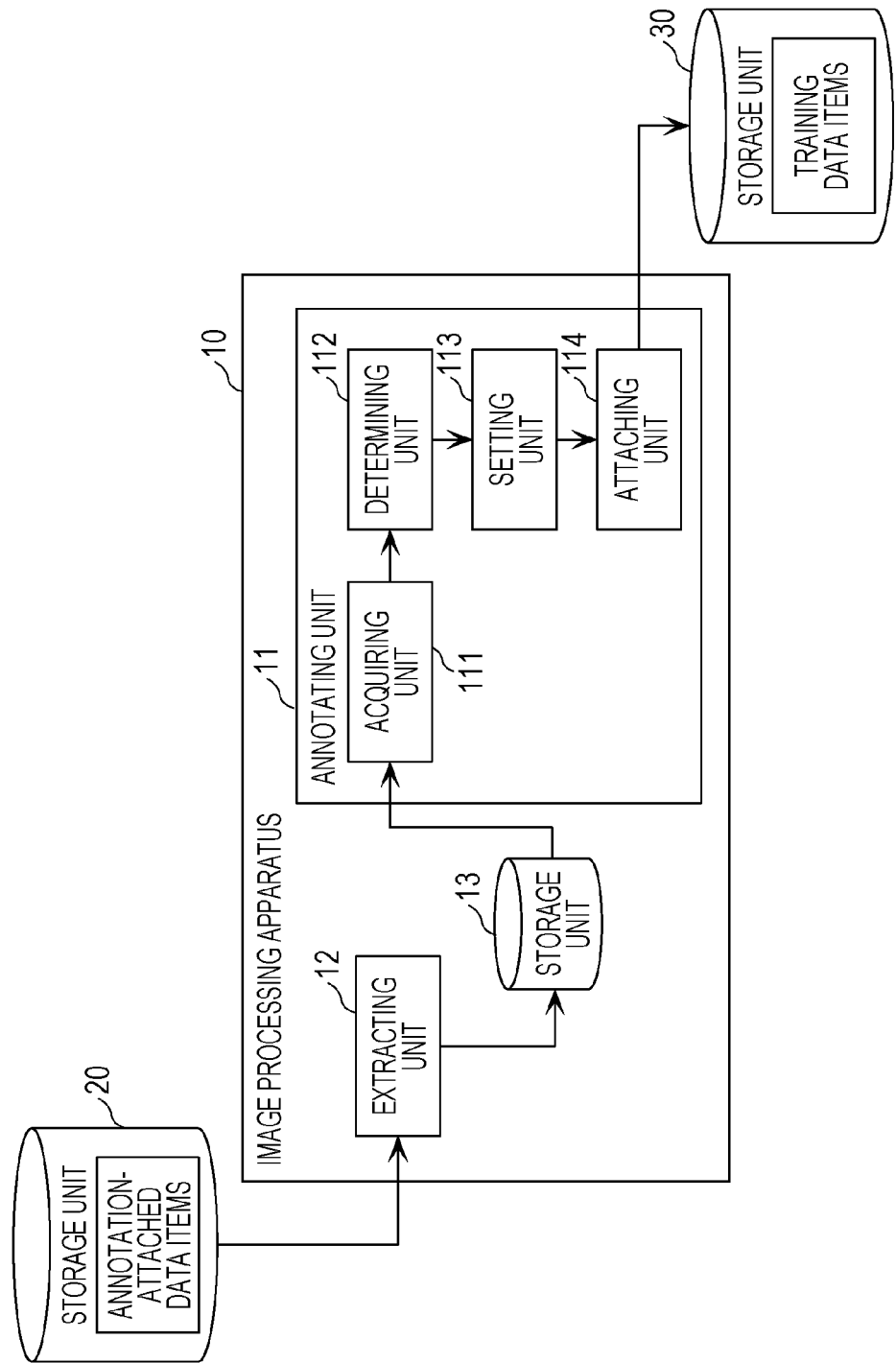
FIG. 1 is a diagram depicting an example of a functional configuration of an image processing apparatus according to a first embodiment.

In the case where an annotation-attaching task requires high-level recognition, the accuracy of the annotation-attaching task is likely to vary between crowdsourcing workers even if the technique disclosed in Japanese Unexamined Patent Application Publication No. 2013-197785 is used. The case where the annotation-attaching task requires high-level recognition is, for example, the case of attaching an annotation indicating a hazard region that can be hazardous because a person crosses in front of a vehicle in motion. Accordingly, the quality of training data items obtained by crowdsourcing varies if the annotation-attaching task requires high-level recognition. When machine learning is performed by using big data constituted by training data items having varying qualities, the accuracy of learning does not increase.

One non-limiting and exemplary embodiment provides an image processing method, an image processing apparatus, and a recording medium capable of reducing the variation in the quality of training data items.

According to an aspect of the present disclosure, an image processing method includes acquiring a plurality of consecutive time-series images that have been captured by an onboard camera mounted on a vehicle and to which a first annotation indicating two or more first regions is attached, the two or more first regions including at least one person region, the plurality of consecutive time-series images at least including one or more images in which the two or more first regions are located on a path of the vehicle and a distance between the two or more first regions is smaller than or equal to a threshold; determining, in reverse chronological order from an image corresponding to the last time point in the time series, a position of each of the two or more regions in each of the plurality of consecutive time-series images acquired in the acquiring; identifying, from among the plurality of consecutive time-series images, a first image corresponding to a first time point for which it has been determined for the first time in the determining that none of the two or more first regions are located on the path, and setting, as a second region, a region between the two or more first regions in the identified first image; and attaching a second annotation to the first image corresponding to the first time point, the second annotation indicating the second region set in the setting.

With such a configuration, the second annotation indicating the second region that requires high-level recognition if recognition is performed by crowdsourcing workers can be autonomously attached to a plurality of images that have been captured by an onboard camera. As a result, the variation in the quality of training data items including the plurality of images can be reduced.

For example, in the identifying and setting, a second image may be identified in which the two or more first regions are located on the path of the vehicle and the distance between the two or more first regions is smaller than or equal to the threshold, and a region between the two or more first regions in each of a plurality of consecutive time-series images from the identified first image to the identified second image may be set as the second region.

With such a configuration, the second annotation indicating the second region can be autonomously attached to one or more images.

In addition, for example, the image processing method may further include performing a first extracting process of selecting, from among all of consecutive time-series images that have been captured by the onboard camera mounted on the vehicle and that are associated with information representing braking force or acceleration of the vehicle, first extracted images that are a plurality of images up to a time point preceding, by a predetermined period, a time point at which the braking force or acceleration of the vehicle is larger than a threshold; and performing a second extracting process of selecting the plurality of consecutive time-series images from among the first extracted images selected through the first extracting process.

With such a configuration, the second annotation indicating the second region can be attached autonomously after time-series images, to which the second annotation indicating the second region may be attached and which include at least one image to which the first annotation indicating the first region is attached, are extracted from among the plurality of images that have been captured by the onboard camera.

For example, the image processing method may further include causing crowdsourcing workers to attach, to each of the all of the consecutive time-series images, the first annotation indicating the first region existing in the image prior to the first extracting process.

In addition, for example, the image processing method may further include causing crowdsourcing workers to attach, to each of the first extracted images selected through the first extracting process, the first annotation indicating the first region existing in the first extracted image prior to the second extracting process.

With such a configuration, crowdsourcing workers can be caused to attach the first annotation indicating the first region that exists in each image.

For example, each of the two or more first regions may be a person region representing a person.

With such a configuration, the second annotation indicating the second region can be attached autonomously as a hazard region involving a risk of collision with a person when the vehicle travels in the second region.

In addition, for example, the two or more first regions may include a person region representing a person and a vehicle region representing a stationary vehicle.

With such a configuration, the second annotation indicating the second region can be attached autonomously as a hazard region involving a risk of collision when the vehicle travels in the second region.

In addition, for example, the second region may be a hazard region in which, when objects represented by the two or more first regions approach, at least one of the objects crosses in front of the vehicle and possibly collides with the vehicle, and the image processing method may further include adding, to the second annotation attached in the attaching, a hazard level that increases as an area of the second region decreases.

With such a configuration, the hazard level can further included in the second annotation indicating the second region that is a hazard region for a vehicle in motion.

In addition, for example, the second region may be a hazard region in which, when objects represented by the two or more first regions approach, at least one of the objects crosses in front of the vehicle and possibly collides with the vehicle, and the image processing method may further include adding, to the second annotation attached in the attaching, different hazard levels for a first sub-region and a second sub-region that constitute the second region, the hazard level for one of the first sub-region and the second sub-region that is closer to one of the two first regions having the second region interposed therebetween and involving a larger amount of movement being higher than the hazard level for the other of the first sub-region and the second sub-region.

With such a configuration, the hazard level can further included in the second annotation indicating the second region that is a hazard region for a vehicle in motion.

In addition, for example, the determining may include performing a first determining process of determining, in reverse chronological order from the image corresponding to the last time point in the time series, the first image corresponding to a third time point to which the first annotation is not attached from among the plurality of consecutive time-series images acquired in the acquiring, and performing a second determining process of determining, through image processing, whether the first region exists at a position in each of the images that is obtained by shifting the first region in an image corresponding to the next time point after the third time point of the first image that has been determined through the first determining process in a direction perpendicular to a direction in which the vehicle moves in reverse chronological order from the image corresponding to the third time point.

With such a configuration, it can be determined whether at least one image includes the first region through image processing even if the first annotation indicating the first region, which is supposed to be attached to the at least one image, is not attached. With the first annotation, the second annotation indicating the second region that requires high-level recognition can be further attached. Consequently, the variation in the quality of training data items including the plurality of images can be reduced.

In addition, according to another aspect of the present disclosure, an image processing apparatus includes an acquirer that acquires a plurality of consecutive time-series images that have been captured by an onboard camera mounted on a vehicle and to which a first annotation indicating two or more first regions is attached, the two or more first regions including at least one person region, the plurality of consecutive time-series images at least including one or more images in which the two or more first regions are located on a path of the vehicle and a distance between the two or more first regions is smaller than or equal to a threshold; a determiner that determines, in reverse chronological order from an image corresponding to the last time point in the time series, a position of each of the two or more regions in each of the plurality of consecutive time-series images acquired by the acquirer; a setter that identifies, from among the plurality of consecutive time-series images, a first image corresponding to a first time point for which it has been determined for the first time by the determiner that none of the two or more first regions are located on the path, and sets, as a second region, a region between the two or more first regions in the identified first image; and an attacher that attaches a second annotation to the first image corresponding to the first time point, the second annotation indicating the second region set by the setter.

It should be noted that these general or specific embodiments may be implemented as a system, a method, an integrated circuit, a computer program, a computer-readable recording medium such as a CD-ROM, or any selective combination thereof.

An image processing method and the like according to an aspect of the present disclosure will be described specifically below with reference to the accompanying drawings. Each of the embodiments described below provides specific examples of the present disclosure. The values, shapes, materials, components, arranged positions of the components, etc., described in the following embodiments are merely illustrative and are not intended to limit the present disclosure. In addition, among the components in the following embodiments, a component not recited in any of the independent claims indicating the most generic concept is described as an optional component. In addition, the configuration of each embodiment can be combined with that of another embodiment.

First Embodiment

Configuration of Image Processing Apparatus 10

FIG. 1 is a diagram depicting an example of a functional configuration of an image processing apparatus 10 according to a first embodiment.

The image processing apparatus 10 performs image processing for autonomously attaching, to annotation-attached data items stored in a storage unit 20, another annotation that requires high-level recognition if it is done by workers and outputs resultant data items as training data items to a storage unit 30. In the first embodiment, the annotation-attached data items are a plurality of images that have been captured by an onboard camera and to which an annotation (first annotation) indicating a person (person region) that obviously exists in the respective images is attached by crowdsourcing workers. Since attaching an annotation to a person who obviously exists in images does not require high-level recognition of workers, the outcome is unlikely to vary between workers and the quality does not vary.

In the first embodiment, the image processing apparatus 10 includes an annotating unit 11, an extracting unit 12, and a storage unit 13 as depicted in FIG. 1. Each of the components will be described in detail below.

Annotating Unit 11

Figure 2:
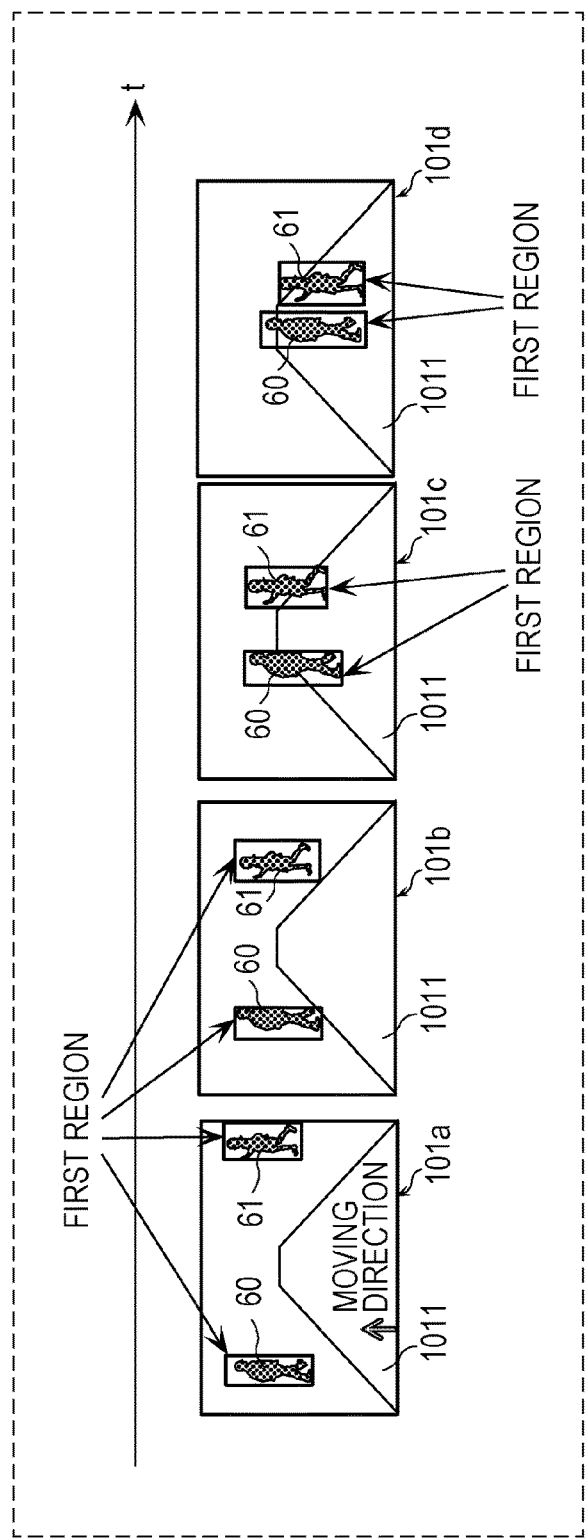
FIG. 2 is a diagram depicting an example of a plurality of images acquired by an annotating unit in the first embodiment.
Figure 3:
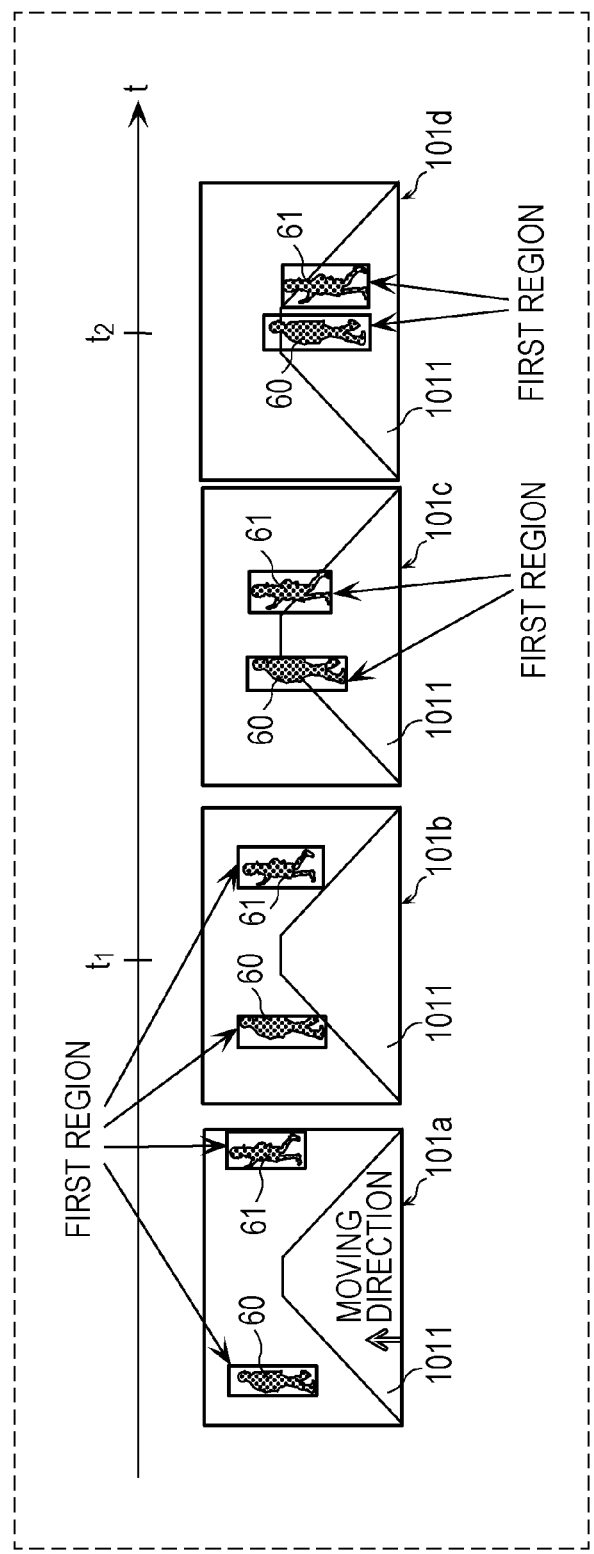
FIG. 3 is an explanatory diagram of image processing performed by the annotating unit on the plurality of images depicted in FIG. 2 in the first embodiment.
Figure 4:
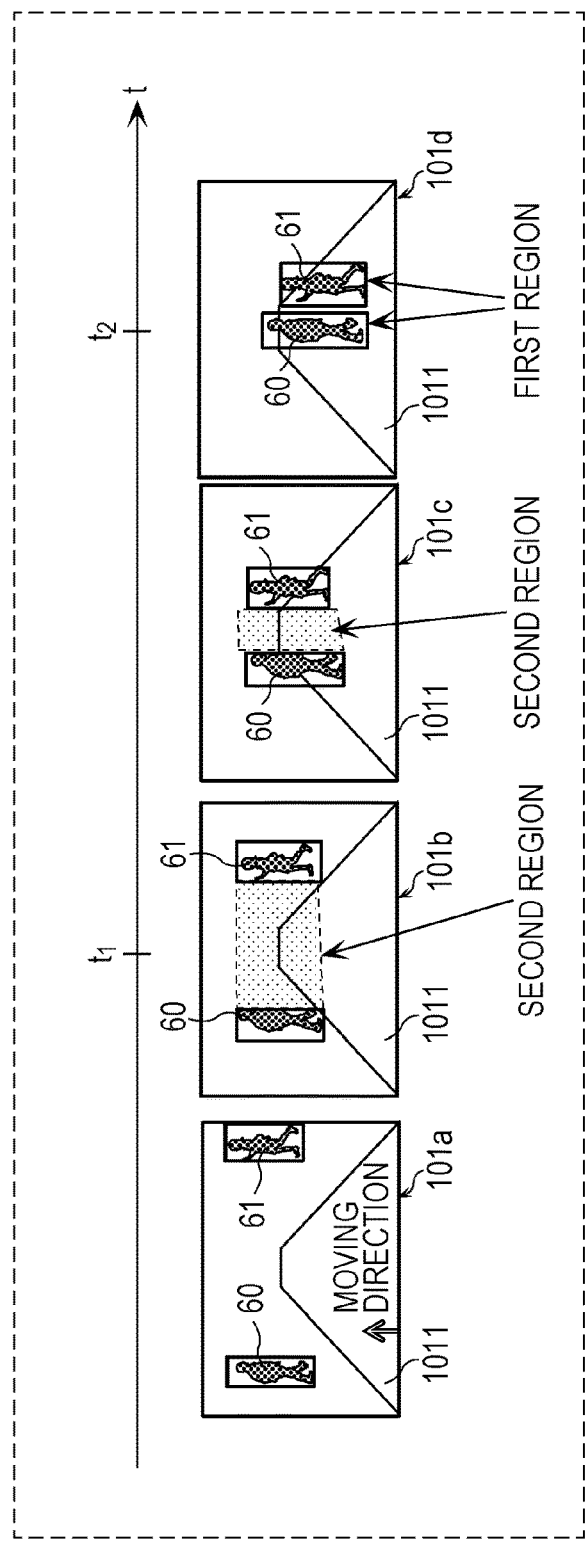
FIG. 4 is an explanatory diagram of an example of the image processing performed by the annotating unit on the plurality of images depicted in FIG. 2 in the first embodiment.

FIG. 2 is a diagram depicting an example of a plurality of images acquired by the annotating unit 11 in the first embodiment. FIGS. 3 and 4 are explanatory diagrams of an example of image processing performed by the annotating unit 11 on the plurality of images depicted in FIG. 2 in the first embodiment.

The annotating unit 11 includes an acquiring unit 111, a determining unit 112, a setting unit 113, and an attaching unit 114 as depicted in FIG. 1.

Acquiring Unit 111

The acquiring unit 111 acquires a plurality of images that are consecutive time-series images captured by an onboard camera mounted on a vehicle and to which first annotations indicating two or more first regions, at least one of which is a person region, are attached. The plurality of images at least include one or more images in which the two or more first regions are present on a path of the vehicle and a distance between the first regions is smaller than or equal to a threshold. The following description will be given on the assumption that each of the two or more first regions is a person region representing a person.

In the first embodiment, the acquiring unit 111 acquires, from the storage unit 13, data items to which the first annotation indicating the first region is attached, such as a plurality of consecutive time-series images depicted in FIG. 2, for example.

Now, the plurality of consecutive time-series images are described with reference to FIG. 2.

The plurality of images depicted in FIG. 2 are some of a plurality of images that constitute training data items and are a plurality of consecutive time-series images that constitute a part of a video image captured by an onboard camera mounted on a vehicle, for example. More specifically, the plurality of images depicted in FIG. 2 include frames 101a, 101b, 101c, and 101d. Each of the plurality of images includes (images of) a road 1011 and persons 60 and 61. Since movement of a vehicle such as an automobile is larger (faster) than movement of the persons 60 and 61 in general in images constituting a video image captured by an onboard camera, the persons 60 and 61 appear to move away (or approach) in the plurality of images.

Further, the plurality of images (frames 101a to 101d) include a first region (first annotation). The first region (first annotation) indicates a person region that represents the person 60 or 61 who obviously exists in the image. For example, in the frames 101d and 101c (one or more images from among the plurality of images), the two first regions representing the persons 60 and 61 are present on the road 1011, which is a path of the vehicle, and a distance between the two first regions is smaller than or equal to a threshold. The threshold may be set to be smaller than or equal to a width of a person or to zero, for example.

Determining Unit 112

The determining unit 112 determines, for each of the plurality of images acquired by the acquiring unit 111, the position of each of the two or more first regions in reverse chronological order from the image corresponding to the last time point of the time series.

In the first embodiment, the determining unit 112 determines, for each of the plurality of images depicted in FIG. 2, the position of each of the two first regions on the basis of the first annotation attached to the image (frame) in an order of the frame 101d, the frame 101c, the frame 101b, and the frame 101a, for example. For example, since two first annotations are attached to the frame 101d, the determining unit 112 determines that the frame 101d includes two first regions and determines the position and dimensions of frames representing the two first regions that exist in the frame 101d. The determining unit 112 performs the similar determination for the frames 101c to 101a in this order, a description of which is omitted since the determination process is as described above.

Setting Unit 113

The setting unit 113 identifies the first image corresponding to a first time point for which the determining unit 112 has determined that none of the two or more first regions are located on the path of the vehicle from among the plurality of images. The setting unit 113 then sets, as a second region, a region between the two or more first regions in the identified first image. The setting unit 113 may further identify a second image in which the two or more first regions are located on the path of the vehicle and the distance between the first regions is smaller than or equal to a threshold. In this case, the setting unit 113 may set, as the second region, a region between the two or more first regions in a plurality of consecutive time-series images located from the identified first image to the identified second image.

In the first embodiment, as depicted in FIG. 3, the setting unit 113 identifies the frame 101b (first image) corresponding to a time point $t_1$ for which the determining unit 112 has determined for the first time that none of the first regions representing the persons 60 and 61 are located on the road 1011 from among the plurality of images depicted in FIG. 2. The setting unit 113 then sets, as the second region, a region between the first region representing the person 60 and the first region representing the person 61 in the identified frame 101b. The second region indicates a hazard region involving a risk of collision with an objet, such as a person represented by the first region, when the vehicle is in motion.

The setting unit 113 further identifies the frame 101d (or frame 101c) as the second image in which the first regions representing the persons 60 and 61 are on the road 1011 which is the path of the vehicle and the distance between these first regions is smaller than or equal to the threshold. In this case, the setting unit 113 sets, as the second region, a region between the first region representing the person 60 and the first region representing the person 61 in the frames 101b to 101d which are a plurality of images located from the frame 101b, which is the first image, and the frame 101d, which is the second image.

In this way, the setting unit 113 successfully sets the second region in one or more images autonomously.

Attaching Unit 114

The attaching unit 114 attaches the second annotation indicating the second region set by the setting unit 113.

In the first embodiment, the attaching unit 114 attaches the second annotation indicating the second region set by the setting unit 113 to, for example, the images depicted in FIG. 4. The attaching unit 114 also outputs, as training data items to the storage unit 30, the plurality of images to which the second annotation is attached (annotation-attached data to which the second annotation is further attached).

Note that the annotating unit 11 need not necessarily output the plurality of images. In this case, the attaching unit 114 may output information regarding a plurality of images to which an annotation, such as the coordinate values of the first regions representing the persons 60 and 61 and the coordinate values of the second region, is to be attached, for example.

Configuration of Extracting Unit 12

Figure 5:
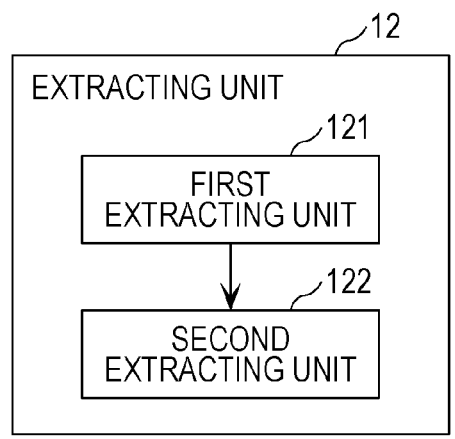
FIG. 5 is a diagram depicting an example of a detailed functional configuration of an extracting unit depicted in FIG. 1.
Figure 6:
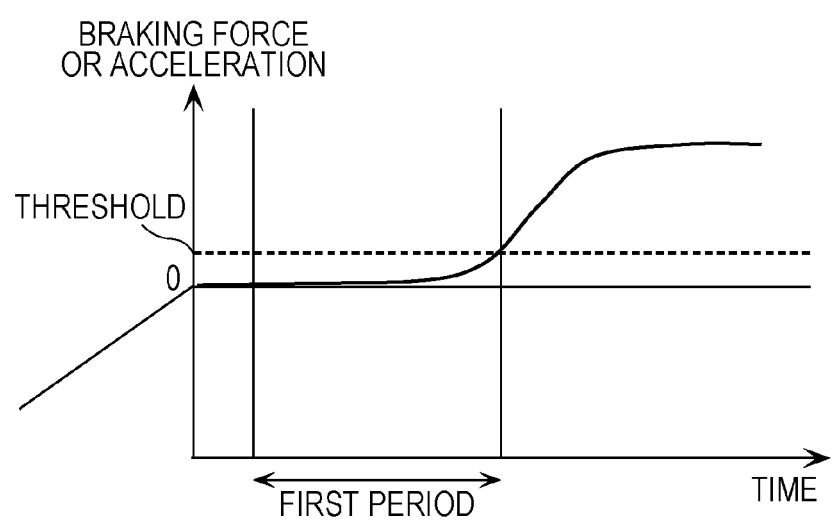
FIG. 6 is an explanatory diagram of a first extracting method performed by the extracting unit in the first embodiment.
Figure 7:
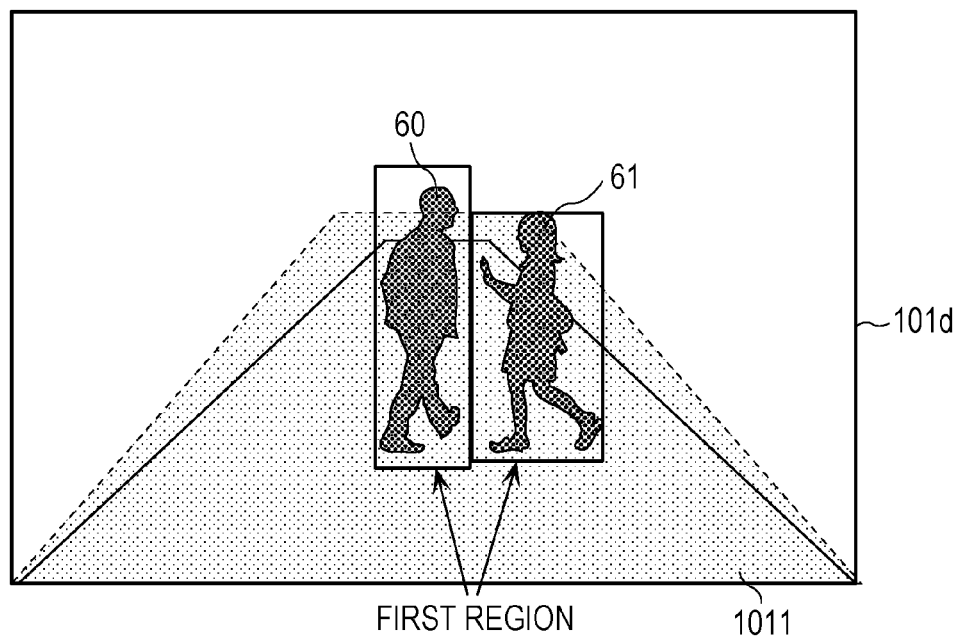
FIG. 7 is an explanatory diagram of a second extracting method performed by the extracting unit in the first embodiment.

FIG. 5 is a diagram depicting an example of a detailed functional configuration of the extracting unit 12 depicted in FIG. 1. FIG. 6 is an explanatory diagram of a first extracting method performed by the extracting unit 12 in the first embodiment. FIG. 7 is an explanatory diagram of a second extracting method performed by the extracting unit 12 in the first embodiment.

As depicted in FIG. 5, the extracting unit 12 includes a first extracting unit 121 and a second extracting unit 122.

The extracting unit 12 extracts predetermined time-series images from among annotation-attached data items acquired from the storage unit 20 and stores the predetermined time-series images in the storage unit 13. The predetermined time-series images are time-series images that are possibility assigned a hazard region that involves a risk of collision of a vehicle because, if persons approach, the persons cross in front of the vehicle in motion and that requires high-level recognition if it is assigned by workers.

In the first embodiment, the storage unit 20 is constituted by a hard disk drive (HDD), a memory, or the like and stores data items to which an annotation is attached by crowdsourcing workers (annotation-attached data items).

More specifically, the annotation-attached data items are all the consecutive time-series images that have been captured by an onboard camera mounted on the vehicle and that are associated with information representing braking force or acceleration of the vehicle. The annotation-attached data items are all the images to which the first annotation indicating the first region that is a person region in the respective images is attached by crowdsourcing workers.

The first extracting unit 121 extracts, for example, a plurality of images (first extracted images) associated with a first period depicted in FIG. 6 on the basis of braking information or the like from among all the images which are the annotation-attached data items stored in the storage unit 20. More specifically, the first extracting unit 121 selects, from among all the consecutive time-series images that have been captured by an onboard camera mounted on a vehicle and that are associated with information representing braking force or acceleration of the vehicle, the first extracted images which are a plurality of images in a range from a time point at which the braking force or acceleration of the vehicle exceeds a threshold to a time point preceding the time point by a predetermined period.

Then, the second extracting unit 122 further extracts, from among the first extracted images selected by the first extracting unit 121, the plurality of images. In the first embodiment, the second extracting unit 122 further extracts, from among the plurality of images (first extracted images) extracted by the first extracting unit 121, the plurality of images by performing image processing, for example. More specifically, the second extracting unit 122 extracts a plurality of consecutive time-series images (such as the frame 101*d* depicted in FIG. 7, for example) that have been captured by an onboard camera mounted on a vehicle, to which the first annotations indicating the two first regions representing the persons 60 and 61 are attached, and that at least include one or more images in which the two first regions are on the road 1011 and the distance between the first regions is smaller than or equal to the threshold.

The second extracting unit 122 then stores the plurality of extracted images in the storage unit 13.
Storage Unit 13

The storage unit 13 is constituted by an HDD, a memory, or the like. The storage unit 13 stores the plurality of images extracted by the extracting unit 12.
Operation of Image Processing Apparatus 10

An operation performed by the image processing apparatus 10 configured in the above manner will be described next with reference to FIGS. 8 and 9.

Figure 8:
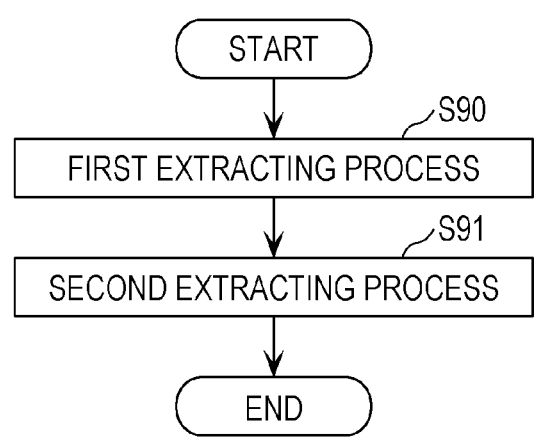
FIG. 8 is a flowchart describing an operation performed by the extracting unit of the image processing apparatus in the first embodiment.

FIG. 8 is a flowchart describing an operation performed by the extracting unit 12 of the image processing apparatus 10 in the first embodiment.

Referring to FIG. 8, the extracting unit 12 of the image processing apparatus 10 first acquires annotation-attached data items from the storage unit 20.

Then, the extracting unit 12 performs a first extracting process on the acquired annotation-attached data items by using braking information or the like (S90). Specifically, the extracting unit 12 extracts, from among all the consecutive time-series images that have been captured by an onboard camera mounted on a vehicle and that are associated with information representing braking force or acceleration of the vehicle, the first extracted images which are a plurality of images in a range from a time point at which the braking force or acceleration of the vehicle exceeds a threshold to a time point that is a predetermined period before the time point as described above.

Then, the extracting unit 12 further performs a second extracting process on the first extracted images obtained in S90 by performing image processing or the like (S91). Specifically, the extracting unit 12 selects, from among the first extracted images extracted through the first extracting process, a plurality of images that are consecutive time-series images captured by the onboard camera mounted on the vehicle, to which the first annotations indicating the two first regions representing the persons are attached, and that at least include one or more images in which the two first regions are located on the path of the vehicle and the distance between the first regions is smaller than or equal to the threshold as described above. The extracting unit 12 then stores the plurality of images selected (extracted) through the second extracting process in the storage unit 13.

Figure 9:
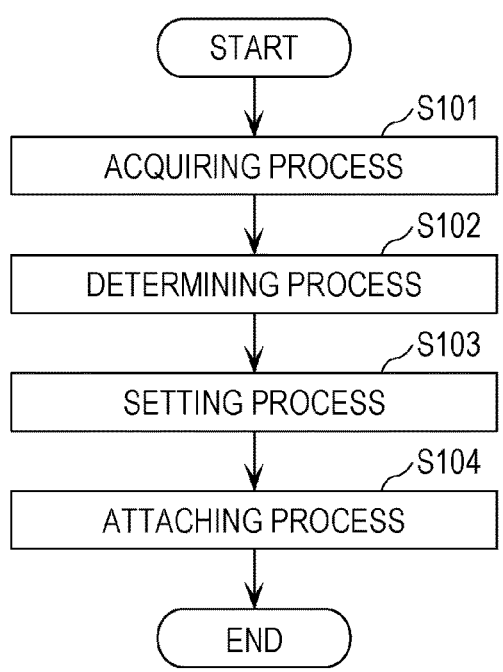
FIG. 9 is a flowchart describing an operation performed by the annotating unit of the image processing apparatus in the first embodiment.

FIG. 9 is a flowchart describing an operation performed by the annotating unit 11 of the image processing apparatus 10 in the first embodiment.

Referring to FIG. 9, the annotating unit 11 of the image processing apparatus 10 first performs an acquiring process of acquiring, from the storage unit 13, the plurality of images extracted through the second extracting process (S101).

Then, the annotating unit 11 performs a determining process of determining, for each of the plurality of images acquired in S101 in reverse chronological order from the image corresponding to the last time point in the time series, the position of each of the two or more first regions (S102).

Then, the annotating unit 11 performs a setting process of identifying the first image corresponding to the first time point for which it has been determined in S102 that none of the two or more first regions are located on the path of the vehicle from among the plurality of images and of setting, as the second region, a region between the two or more first regions in the identified first image (S103).

Then, the annotating unit 11 performs an attaching process of attaching the second annotation indicating the second region set in S103 (S104). The annotating unit 11 then outputs, as training data items to the storage unit 30, the plurality of images to which the second annotation is attached.

In this way, the image processing apparatus 10 successfully performs image processing for autonomously attaching, to annotation-attached data items stored in the storage unit 20, another annotation that requires high-level recognition if it is done by workers and successfully outputs the resultant data items as training data items to the storage unit 30.

The image processing apparatus 10 performs the first extracting process (S90) and the second extracting process (S91) by using annotation-attached data items stored in the storage unit 20 in the above description; however, the configuration is not limited to this one. Specifically, annotation-attached data items are generated by causing crowdsourcing workers to attach the first annotation indicating the first region that is a person region in respective images to all the images before the image processing apparatus 10 performs the first extracting process (S90) in the above description; however, the configuration is not limited to this one.

The image processing apparatus 10 may acquire all the consecutive time-series images that have been captured by the onboard camera and to which no annotation is attached and may perform the first extracting process (S90) on the all the acquired images. In this case, crowdsourcing workers may be caused to attach, to each of a plurality of images (first extracted images) extracted through the first extracting process, an annotation indicating a region representing a moving object that is present in the image. That is, crowdsourcing workers may be caused to attach the first annotation indicating the first region that is a person region in each of the first extracted images to the corresponding one of the first extracted images selected through the first extracting process (S90) before the second extracting process (S91) is performed.

Advantageous Effects

As described above, according to the first embodiment, an image processing method and the like capable of reducing the variation in the quality of training data items including the plurality of images can be implemented.

Advantageous effects provided by the image processing method and the like according to the first embodiment will be described with reference to FIG. 10. FIG. 10 is an explanatory diagram of advantageous effects of the first embodiment. A plurality of images depicted in FIG. 10(a) are an example of the plurality of consecutive time-series images obtained by capturing a scene ahead of a vehicle (in the traveling direction of the vehicle) by using an onboard camera mounted on the vehicle. FIG. 10(b) depicts braking force or acceleration that is associated with each of the plurality of images depicted in FIG. 10(a). The same reference signs are assigned to substantially the same components depicted in FIG. 2 and other figures, and a detailed description thereof is omitted.

FIG. 10(a) and FIG. 10(b) indicate that a driver of the vehicle on which the onboard camera is mounted brakes hard upon starting seeing the persons 60 and 61 approaching and crossing in front of the vehicle in the frame 101c at a time point $t_p$ and acceleration changes in response to braking.

Accordingly, in order to notify the driver of the vehicle of a region between the persons 60 and 61 that is likely to be a hazard region for the vehicle in motion because, if the persons 60 and 61 approach, the persons 60 and 61 cross in front of the vehicle, it is necessary to perform a learning process by using images to which an annotation (correct information) indicating such a hazard region is attached.

However, in the case where crowdsourcing workers recognize that a region between persons is a hazard region where the vehicle desirably avoid traveling because, if the persons approach, the persons cross in front of the vehicle and is hazardous for the vehicle in motion, the recognition is likely to vary between workers. Accordingly, the accuracy of the task for attaching an annotation to such a hazard region is likely to vary between workers. For example, recognizing that a region between the persons 60 and 61 as a hazard region for the vehicle in motion because, if the persons 60 and 61 approach, the persons 60 and 61 cross in front of the vehicle, for example, by viewing the frame 101b corresponding to a time point $t_1$ depicted in FIG. 10(a) requires high-level recognition, such as experiences and comparison with the image corresponding to the next time point.

On the other hand, the accuracy of the annotating task for attaching the first regions representing the persons 60 and 61 to all the images (frames 101a to 101d) depicted in FIG. 10(a) is unlikely to vary between crowdsourcing workers because of the following reason. Since workers can attach an annotation (first region) representing the person 60 or 61 in the way the person 60 or 61 is seen in the images, such an annotating task does not require high-level recognition.

Thus, in the image processing method according to the first embodiment, attaching an annotation indicating a moving object, such as a person, that is visible in time-series images that have been captured by the onboard camera is performed by crowdsourcing workers.

Attaching an annotation indicating a region (second region) between persons, where if the persons approach, the persons cross in front of the vehicle and are to be hazardous for the vehicle in motion is performed by a machine such as the image processing apparatus 10 or a computer that performs the image processing method. Specifically, a plurality of consecutive time-series images are extracted that have been captured by an onboard camera mounted on a vehicle, to which the first annotations indicating the two first regions representing persons are attached, and that at least include one or more images in which the two first regions are located on the path of the vehicle and the distance between the first regions is smaller than or equal to a threshold. Then, the first image corresponding to a first time point for which it has been determined that none of the two first regions are located on the path of the vehicle is identified from among the plurality of images in reverse chronological order in the time series, a region between the two or more first regions in the identified first image is set as the second region, and the second annotation indicating a hazard region (second region) is attached to the first image.

In the above-described manner, the image processing method and the like according to the first embodiment allow crowdsourcing workers to attach first annotations each indicating the first region that is a person region in each image. In addition, the image processing method and the like according to the first embodiment allow the second annotation indicating the second region, which requires high-level recognition if the annotation is attached by crowdsourcing workers, to be attached autonomously to the plurality of images that have been captured by the onboard camera. As a result, the image processing method and the like according to the first embodiment successfully reduce the variation in the quality of training data items including the plurality of images.

Note that, in the image processing method and the like according to the first embodiment, the first image corresponding to the first time point for which it has been determined that none of the two first regions are located on the path of the vehicle is identified, and a region between the two or more first regions in the identified first image is set as the second region; however, the configuration is not limited to this one. The setting unit 113 may identify a second image in which the two first regions each representing a person are located on the path of the vehicle and the distance between the two first regions is smaller than or equal to the threshold. In this case, the setting unit 113 may set, as the second region, a region between the two or more first regions in image(s) from the second image to an image (first image, for example) preceding the second image by a predetermined period.

First Modification

Figure 11A:
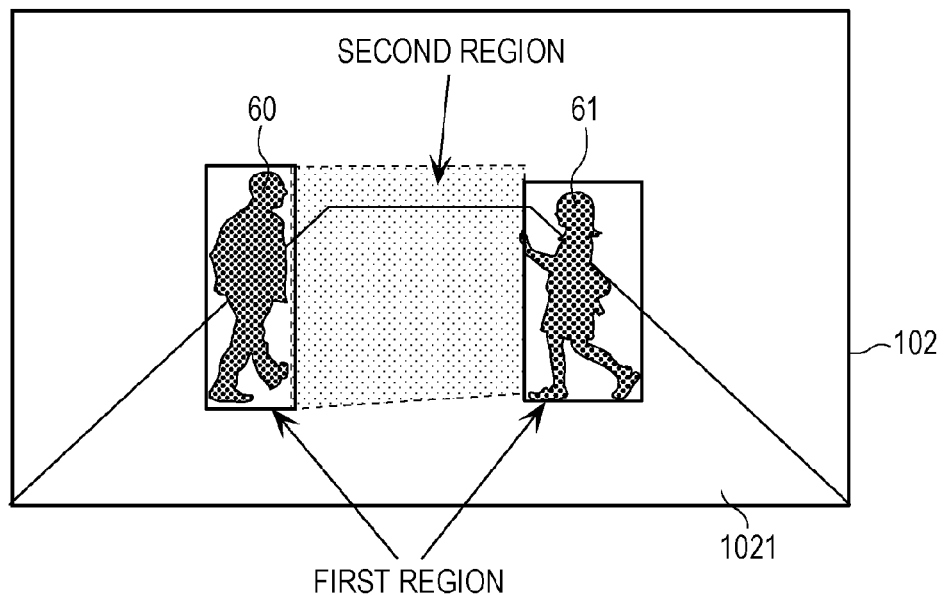
FIG. 11A is a diagram depicting an example of a second region set by the annotating unit in the first embodiment.
Figure 11B:
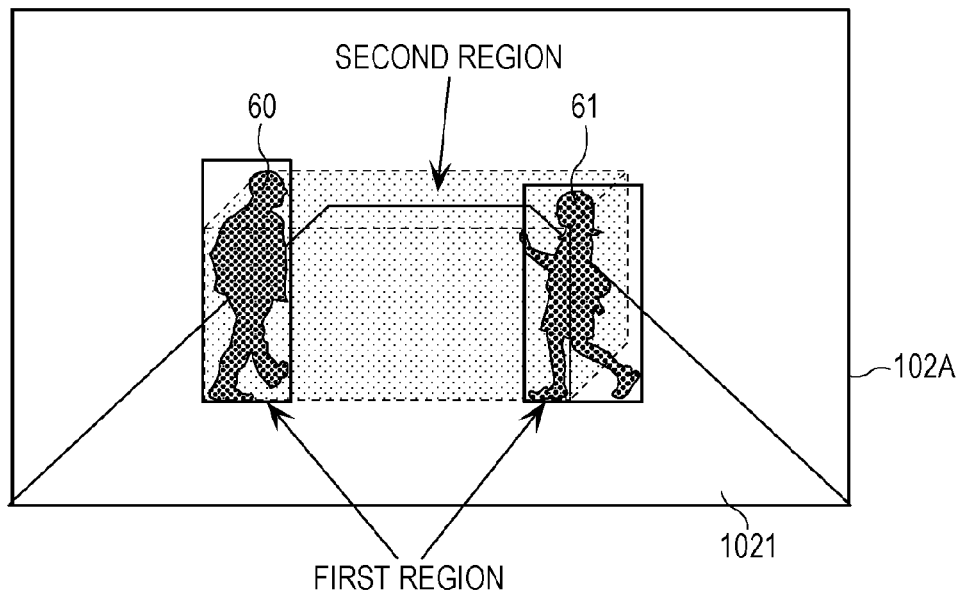
FIG. 11B is a diagram depicting an example of the second region set by the annotating unit in a first modification.

FIG. 11A is a diagram depicting an example of the second region set by the annotating unit 11 in the first embodiment. FIG. 11B is a diagram depicting an example of the second region set by the annotating unit 11 in a first modification.

In the first embodiment, the description has been given of the case where the second region is a two-dimensional region between the two first regions as depicted in FIG. 11A; however, the second region is not limited to this type of region. If there is distance information for each person indicated by a corresponding one of the two first regions included in the plurality of images acquired by the annotating unit 11, the annotating unit 11 may set a space that links the two persons (person regions) as the second region as depicted in FIG. 11B.

Second Modification

In the first embodiment, the description has been given of the example where objects represented by the two or more first regions are two person regions represented by two first regions; however, the configuration is not limited to this example. The two or more first regions may represent three or more person regions. In the second modification, the case where four first regions represent four person regions will be described.

Figure 13:
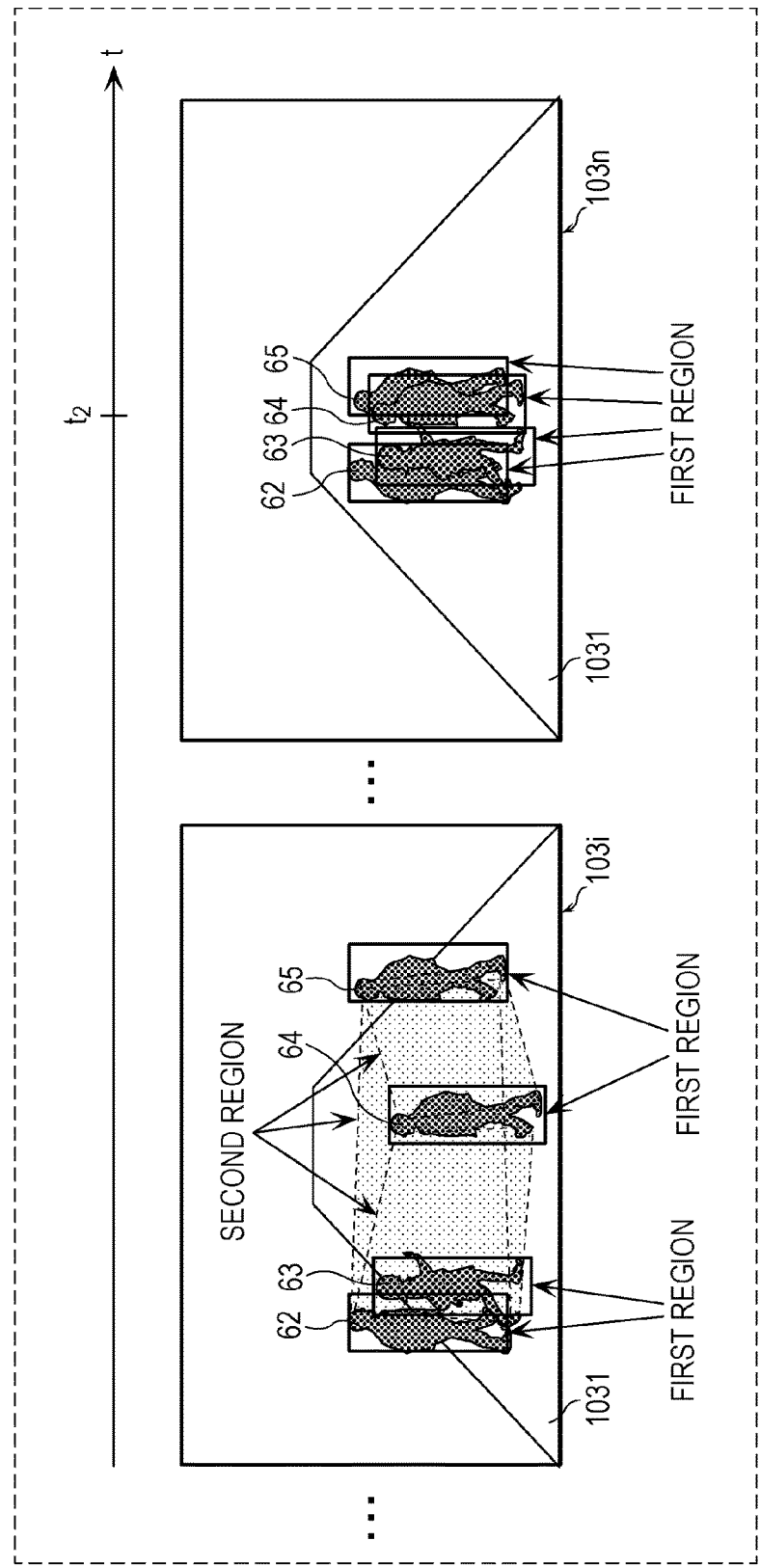
FIG. 13 is a diagram depicting an example of a second region set by the annotating unit in the second modification.

FIG. 12 is a diagram depicting an example of a plurality of images acquired by the annotating unit 11 according to the second modification. FIG. 13 is a diagram illustrating an example of the second region set by the annotating unit 11 according to the second modification.

The annotating unit 11 according to the second modification acquires a plurality of images that include frames 103$i$ and 103$n$ depicted in FIG. 12. Each of the plurality of images depicted in FIG. 12 includes a road 1031 and persons 62, 63, 64, and 65. Further, four first regions (first annotations) representing the persons 62, 63, 64, and 65 are attached to each of the plurality of images depicted in FIG. 12.

The annotating unit 11 according to the second modification identifies the frame 103$a$ (not depicted) as the first image corresponding to the first time point for which none of the four first regions representing the persons 62 to 65 are located on the road 1031 from among the plurality of images depicted in FIG. 12. The annotating unit 11 according to the second modification also identifies the frame 103$n$ corresponding to a time point $t_2$ as the second image in which the four first regions representing the persons 62 to 65 are located on the road 1031 which is a path of the vehicle and a distance between these first regions is smaller than or equal to a threshold.

Then, the annotating unit 11 according to the second modification may determine, as the second region, a region between the four first regions representing the persons 62 to 65 in the frame 103$i$ among a plurality of images from the frame 103$a$, which is the first image, to the frame 103$n$, which is the second image as depicted in FIG. 13.

In the above-described manner, the image processing method and the like according to the second modification enable the second region which is a hazard region for a vehicle in motion to be autonomously set likewise even if the three or more first regions represent three or more person regions and enable the second annotation indicating the second region to be attached autonomously.

Third Modification

In the first embodiment and the first and second modifications, the description has been given of the case where the first region represents a person; however, the configuration is not limited to this case. The object represented by the first region may be a stationary vehicle. In this third modification, the case where one of two first regions is a person region and the other of the two first regions is a vehicle region representing a stationary vehicle will be described with reference to FIGS. 14 and 15.

Figure 14:
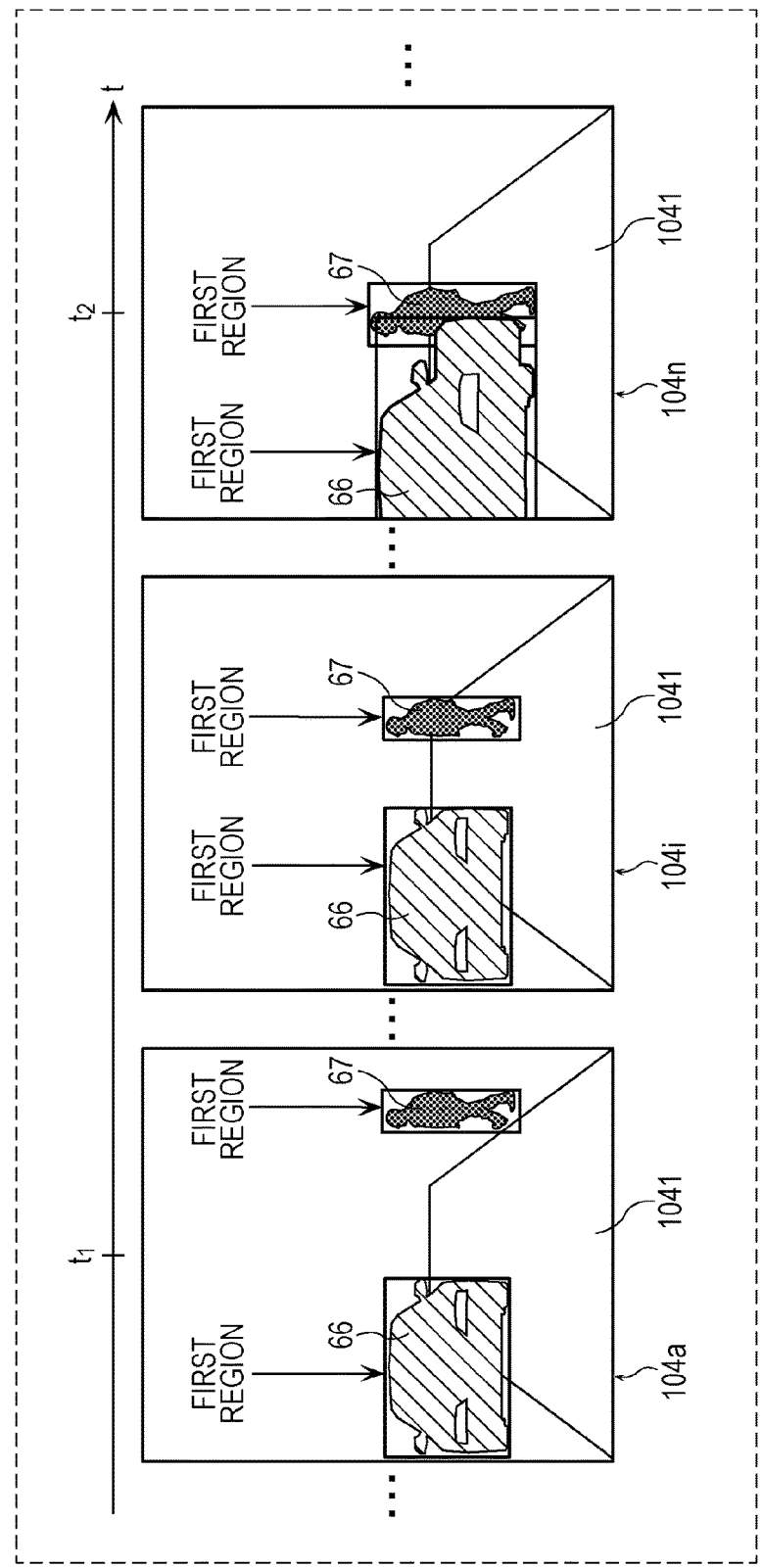
FIG. 14 is a diagram depicting an example of a plurality of images acquired by the annotating unit in a third modification.
Figure 15:
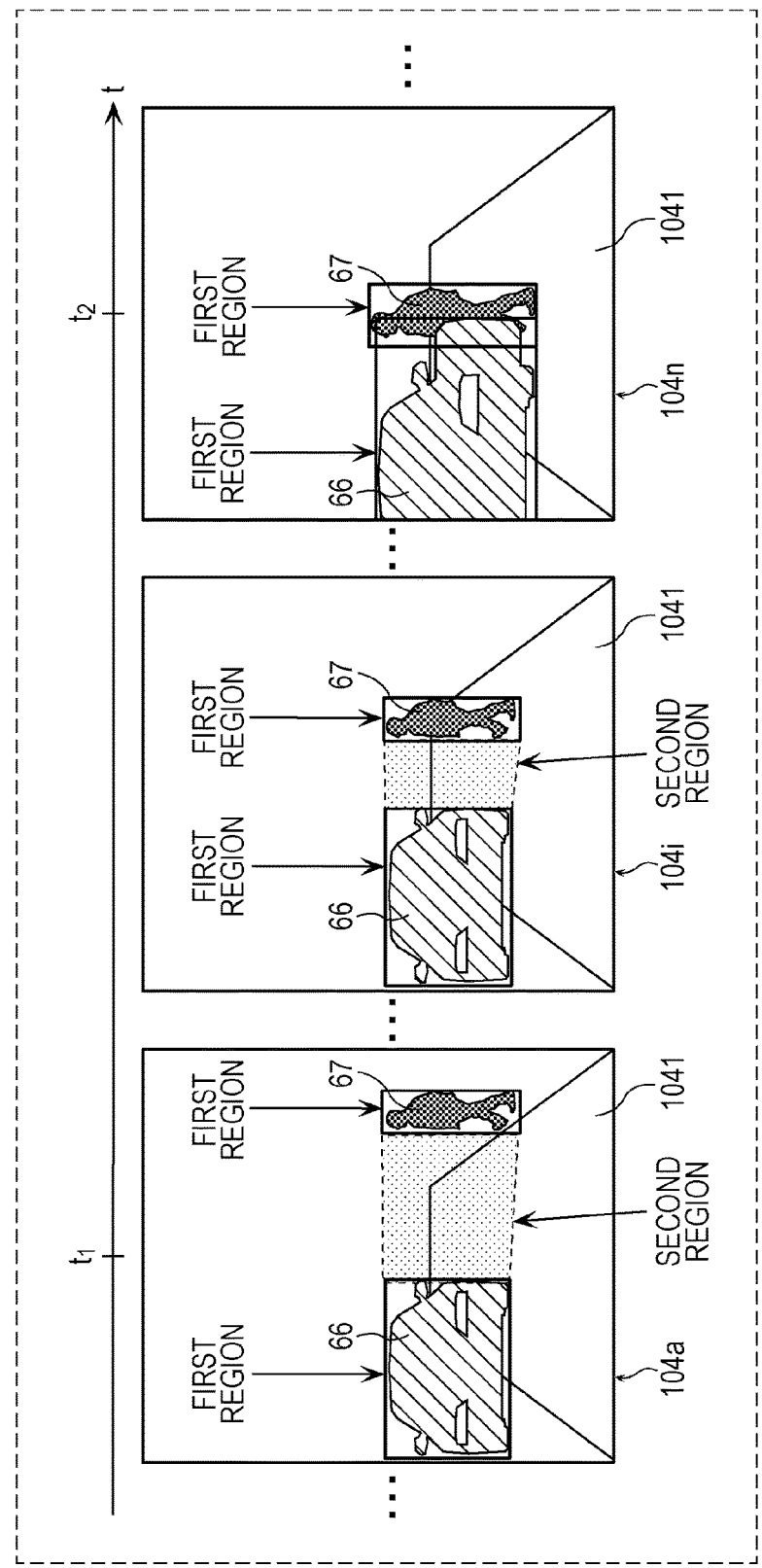
FIG. 15 is a diagram depicting an example of a second region set by the annotating unit in the third modification.

FIG. 14 is a diagram depicting an example of a plurality of images acquired by the annotating unit 11 according to the third modification. FIG. 15 is a diagram depicting an example of a second region set by the annotating unit 11 according to the third modification.

The annotating unit 11 according to the third modification acquires a plurality of images that include frames 104$a$, ..., 104$i$, ..., 104$n$ depicted in FIG. 14. Each of the plurality of images depicted in FIG. 14 includes a road 1041, a vehicle 66, and a person 67. Further, two first regions (first annotations) representing the vehicle 66 and the person 67 are attached to each of the plurality of images depicted in FIG. 14.

The annotating unit 11 according to the third modification identifies the frame 104$a$ corresponding to a time point $t_1$ as the first image corresponding to the first time point for which the first region representing the person 67 is not located on the road 1041 from among the plurality of images depicted in FIG. 14. The annotating unit 11 according to the third modification also identifies the frame 104$n$ corresponding to a time point $t_2$ as the second image in which the two first regions representing the vehicle 66 and the person 67 are located on the road 1041 which is a path of the vehicle and a distance between the two first regions is smaller than or equal to a threshold.

Then, the annotating unit 11 according to the third modification may determine, as the second region, a region between the two first regions representing the vehicle 66 and the person 67 in the plurality of images (frames 104$a$ to 104$n$) from the frame 104$a$, which is the first image, to the frame 104$n$, which is the second image.

In the above-described manner, the image processing method and the like according to the third modification enable the second region which is a hazard region where, even if one of the objects represented by the two first regions is a stationary vehicle, the person crosses in front of a vehicle in motion and collision may occur if the vehicle passes through the region therebetween, to be set autonomously likewise and enable the second annotation indicating the second region to be attached autonomously.

Fourth Modification

In the first embodiment and the first to third modifications, the description has been given of the case where the annotating unit 11 sets the second region and attaches the second annotation indicating the set second region; however, the configuration is not limited to this case. The annotating unit 11 may further set a hazard level for the second region in addition to setting the second region that is a hazard region for a vehicle in motion. In this case, the annotating unit 11 may attach a second annotation indicating a second region and indicating the hazard level for the second region. A method for setting the hazard level of the second region will be described specifically below.

First Example of Hazard-Level Setting Method

Figure 16:
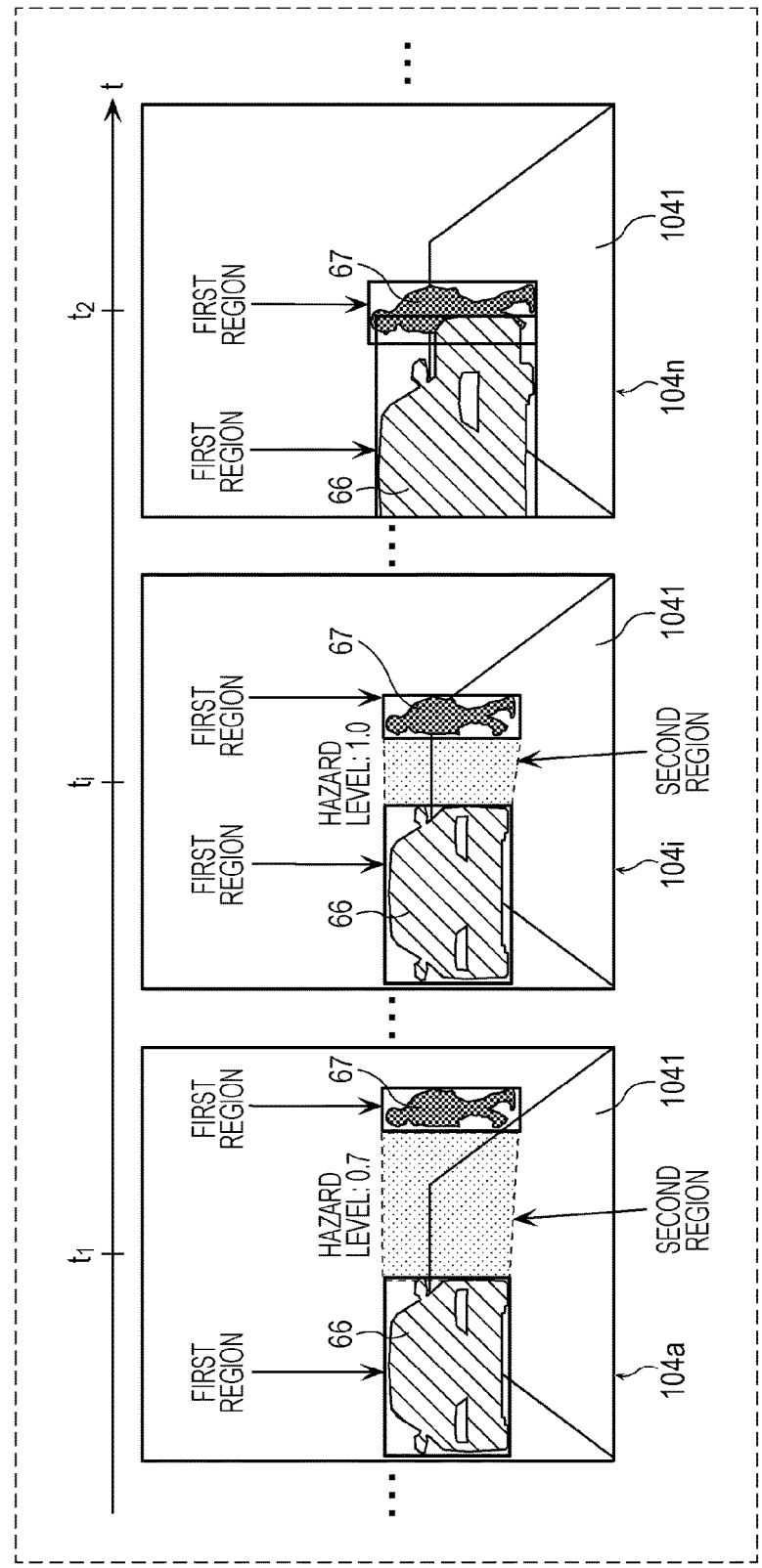
FIG. 16 is a diagram depicting an example of a second annotation attached by the annotating unit in a first example of a fourth modification.

FIG. 16 is a diagram depicting an example of a second annotation attached by the annotating unit 11 according to a first example of a fourth modification.

It is assumed that the annotating unit 11 according to the first example of the fourth modification acquires a plurality of images depicted in FIG. 14 and sets the second region which is a hazard region for a vehicle in motion because, if objects represented by the first regions approach, one of the object crosses in front of the vehicle and possibility collides with the vehicle. Since the operation performed by the annotating unit 11 to set the second region has been described in the third modification, a description thereof is omitted.

In the first example of the fourth embodiment, the annotating unit 11 further sets the hazard level in accordance with the area of the set second region. Specifically, the annotating unit 11 sets the hazard level such that the hazard level increases as the area of the second region decreases because of the following reason. The smaller the area of the second region, the higher the risk of the vehicle colliding with the vehicle 66 and the person 67 if the vehicle travels between the vehicle 66 and the person 67 represented by the first regions, and thus it is desirable that the vehicle avoid going therethrough. Note that if the area of the second region is smaller than or equal to a predetermined area, the hazard level may be set equal to 1.0 (100%).

The annotating unit 11 then attaches the second annotation indicating the second region and the hazard level of the second region that have been set. More specifically, in the first example of the fourth modification, the annotating unit 11 additionally includes the hazard level that takes a larger value as the area of the second region decreases in the second annotation indicating the second region. For example, in the example depicted in FIG. 16, the annotating unit 11 attaches the second annotation indicating a hazard level of 0.7 to the second region in the frame 104a corresponding to a time point $t_1$ and attaches the second annotation indicating a hazard level of 1.0 to the second region in the frame 104i corresponding to a time point $t_i$. If the vehicle passes through the second region in the frame 104i, the vehicle collides with the person 67 for sure. Thus, the second annotation indicating the hazard level of 1.0 is attached.

Second Example of Hazard-Level Setting Method

Figure 17:
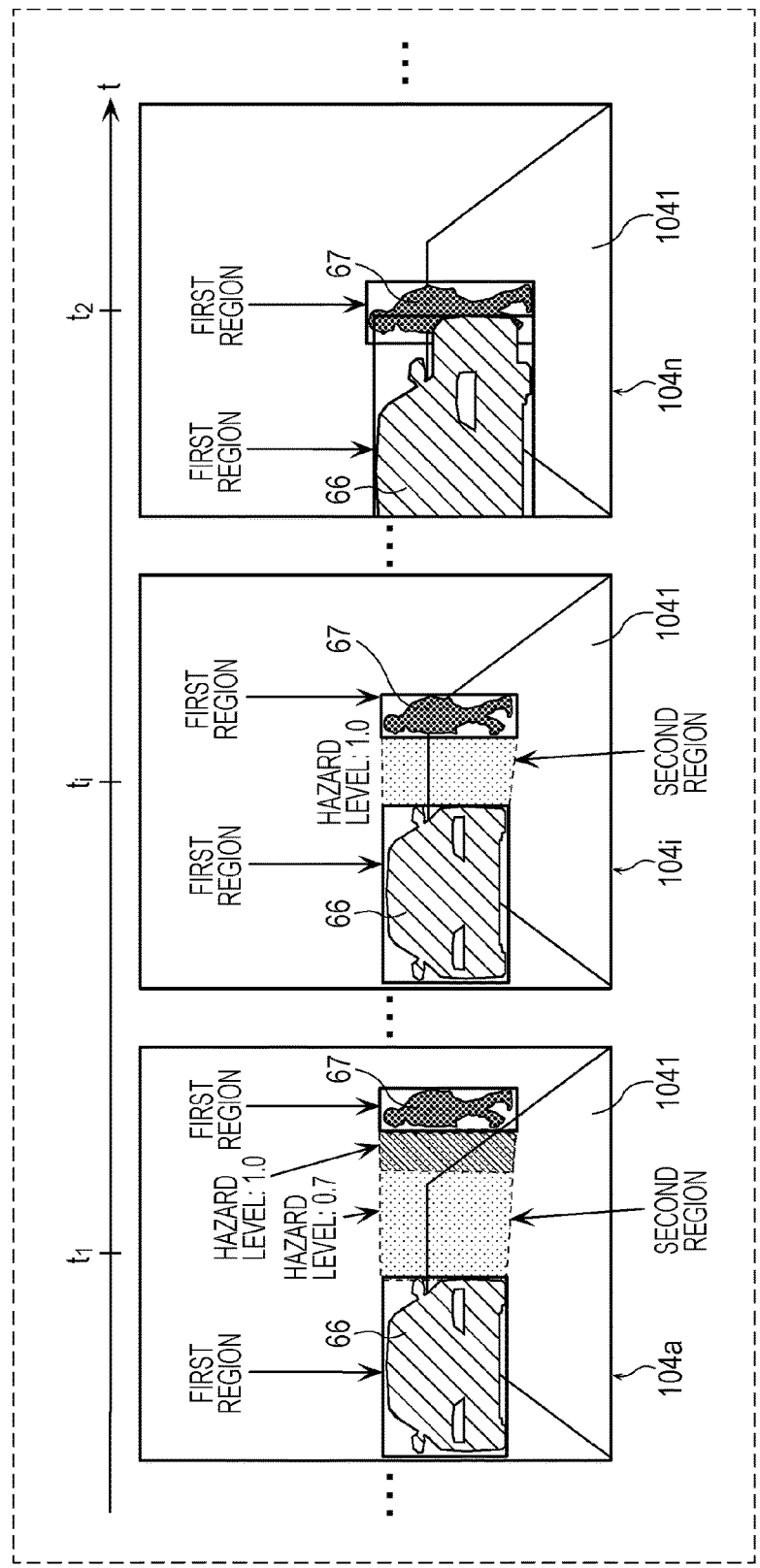
FIG. 17 is a diagram depicting an example of a second annotation attached by the annotating unit in a second example of the fourth modification.

FIG. 17 is a diagram illustrating an example of a second annotation attached by the annotating unit 11 according to a second example of the fourth modification.

It is assumed that the annotating unit 11 according to the second example of the fourth modification acquires a plurality of images depicted in FIG. 14 and sets the second region which is a hazard region for a vehicle in motion because, if objects represented by the first regions approach, one of the object crosses in front of the vehicle and possibility collides with the vehicle. Since the operation performed by the annotating unit 11 to set the second region has been described in the third modification, a description thereof is omitted.

In the second example of the fourth embodiment, the annotating unit 11 sets the hazard level of the set second region by using different weights within the second region. More specifically, the annotating unit 11 divides the second region into two sub-regions and sets the weighted hazard level such that the sub-region closer to one of the first regions representing an object, such as a person, that moves more is assigned a larger value than the sub-region closer to the other first region because of the following reason. When the vehicle travels along the path, the vehicle is more likely to collide with a person who moves more.

The annotating unit 11 then attaches the second annotation indicating the second region and the hazard level of the second region that have been set. More specifically, in the second example of the fourth modification, the annotating unit 11 adds, to the second annotation indicating the second region, different hazard levels for different sub-regions that constitute the second region such that one of the sub-regions that is closer to one of the first regions having the second region interposed therebetween and involving a larger movement amount is assigned a larger value. For example, in the example depicted in FIG. 17, the annotating unit 11 attaches the second annotation indicating a hazard level of 1.0 to a sub-region of the second region that is closer to the person 67 in the frame 104a corresponding to a time point $t_1$ and attaches the second annotation indicating a hazard level of 0.7 to a sub-region of the second region that is closer to the vehicle 66.

The annotating unit 11 attaches the second annotation indicating a hazard level of 1.0 to the entire second region in the frame 104i corresponding to a time point $t_i$ because the area of the sub-region closer to the person 67 becomes smaller than or equal to a predetermined area. When the area of the second region is smaller than or equal to a predetermined area, a single hazard level may be attached instead of attaching the weighted hazard levels.

As described above, the image processing method and the like according to the fourth modification enable the hazard level of the second region for a vehicle in motion to be additionally included in the second annotation representing the second region which is a hazard region that is likely to be hazardous for the vehicle in motion.

Second Embodiment

In the first embodiment, the description has been given of the case where crowdsourcing workers are caused to attach an annotation indicating a moving object, such as a person, visible in time-series images that have been captured by an onboard camera; however, since the quality achieved by the workers is not constant, there may be cases where an annotation indicating the first region representing the moving object, such as a person, is not attached to some of the time-series images that have been captured by the onboard camera even if the moving object is visible in the images.

This case will be described below as a second embodiment in terms of differences from the first embodiment.

Configuration of Image Processing Apparatus 10A

An image processing apparatus 10A (not depicted) according to the second embodiment differs from the image processing apparatus 10 according to the first embodiment in the configuration of a determining unit 112A of an annotating unit 11A (not depicted). Since the rest of the configuration is substantially the same as that of the image processing apparatus 10 according to the first embodiment, a description thereof is omitted.

Determining Unit 112A

Figure 18:
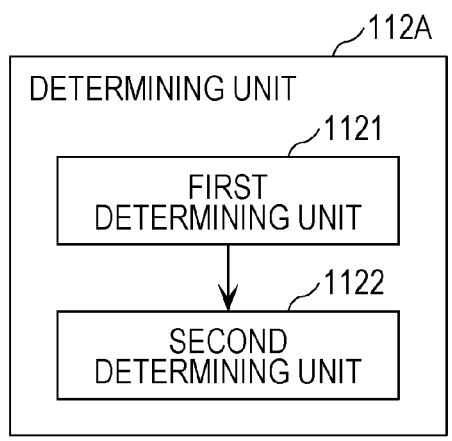
FIG. 18 is a diagram depicting an example of a detailed configuration of a determining unit according to a second embodiment.

FIG. 18 is a diagram illustrating an example of a detailed configuration of the determining unit 112A according to the second embodiment.

The determining unit 112A determines, in reverse chronological order from an image corresponding to the last time point in the time series, the first image to which the first annotation is not attached from among a plurality of images acquired by the acquiring unit 111.

In the second embodiment, the determining unit 112A determines, in reverse chronological order from an image corresponding to the last time point in the time series, the first image to which the first annotation is not attached from among a plurality of images acquired by the acquiring unit 111. The determining unit 112A determines, through image processing, whether the first region exists at a position in each of the images that is obtained by shifting the first region in the image corresponding to the next time point after a third time point of the determined first image in a direction perpendicular to the moving direction of the vehicle in reverse chronological order from the image corresponding to the third time point.

Operation of Image Processing Apparatus 10A

Figure 20:
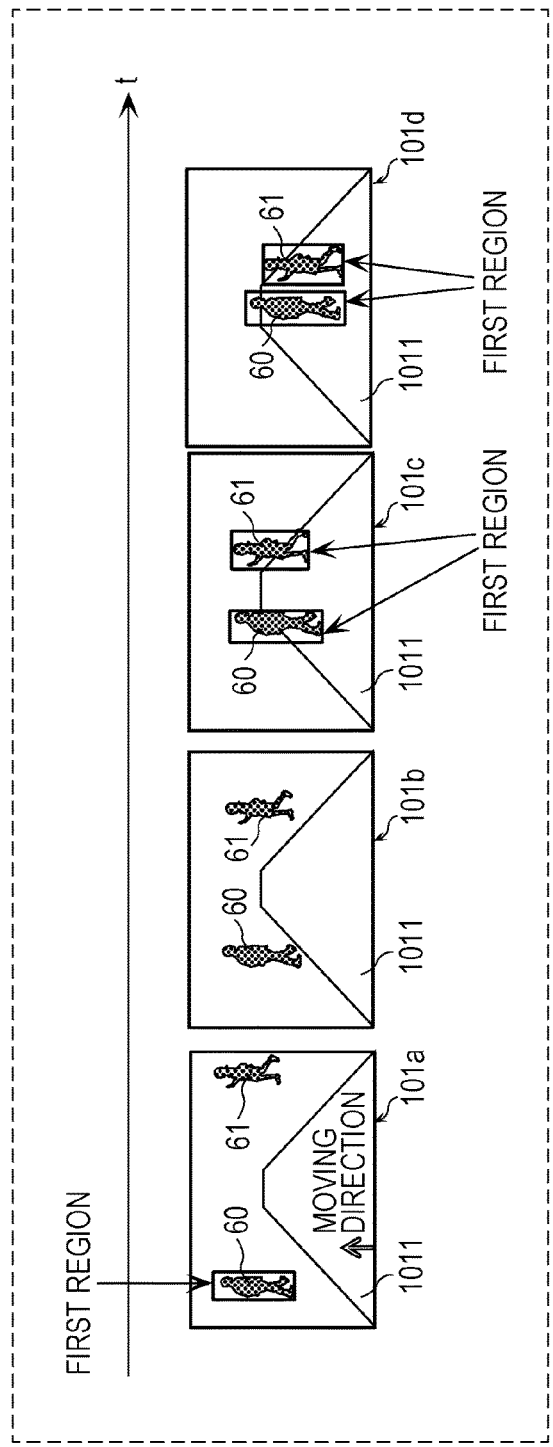
FIG. 20 is a diagram depicting an example of a plurality of images acquired by an acquiring unit in the second embodiment.
Figure 21:
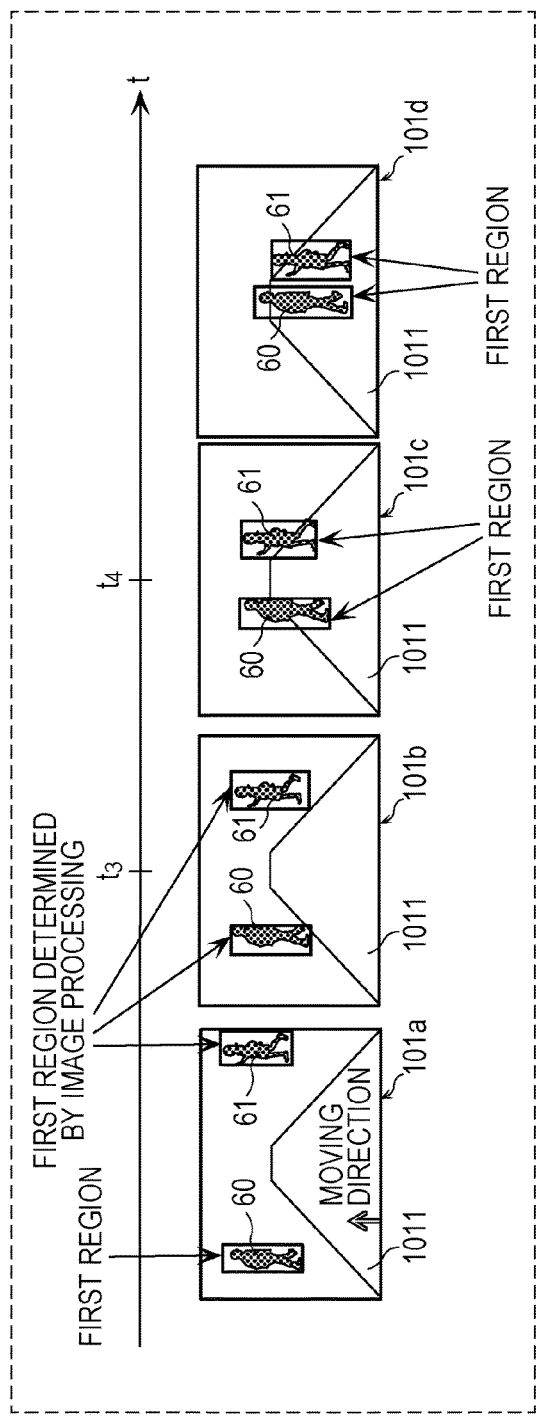
FIG. 21 is an explanatory diagram of image processing performed by the determining unit on the plurality of images depicted in FIG. 20 in the second embodiment.

An operation performed by the image processing apparatus 10A configured in the above manner will be described next with reference to FIGS. 19 to 21.

Figure 19:
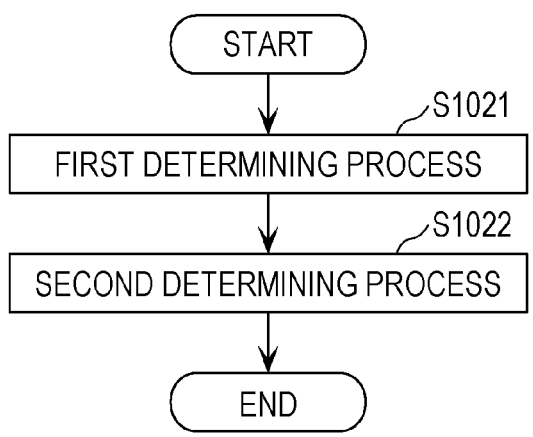
FIG. 19 is a flowchart describing an operation performed by the determining unit of an image processing apparatus according to the second embodiment.

FIG. 19 is a flowchart describing an operation performed by the determining unit 112A of the image processing apparatus 10A in the second embodiment. FIG. 20 is a diagram depicting an example of a plurality of images acquired by the acquiring unit 111 in the second embodiment. FIG. 21 is an explanatory diagram of image processing performed by the determining unit 112A on the plurality of images depicted in FIG. 20 in the second embodiment. The same reference signs are assigned to the same or substantially the same components as those depicted in FIGS. 2 to 4, and a detailed description thereof is omitted.

First, the acquiring unit 111 of the image processing apparatus 10A acquires a plurality of images, which are annotation-attached data items, from the storage unit 20. In the second embodiment, some images out of the plurality of images acquired by the acquiring unit 111 are not assigned a first region (first annotation) indicating the person 60 or 61 even if the person 60 or 61 is visible in the some images. In the example depicted in FIG. 20, the first region is not attached even if the person 60 or 61 is visible in some images (frames 101a and 101b).

Then, the determining unit 112A performs a first determining process of determining, in reverse chronological order from the image corresponding to the last time point in the time series, the first image to which the first annotation is not attached from among the plurality of images acquired by the acquiring unit 111 (S2021). For example, the determining unit 112A determines the frame 101b which is the first image to which the first annotation, that is, the first region is not attached from among the plurality of images (frames 101a to 101d) depicted in FIG. 20 in reverse chronological order from the frame 101d which is the image corresponding to the last time point in the time series.

Then, the determining unit 112A performs a second determining process of determining, through image processing, whether the first region exists at a position in each of the images that is obtained by shifting the first region in the image corresponding to the next time point after the third time point of the determined first image in a direction perpendicular to the moving direction of the vehicle in reverse chronological order from the image corresponding to the third time point (S1022). For example, as depicted in FIG. 21, the determining unit 112A determines, through image processing, whether the first region exists at a position in each of the images (frames 101b to 101a) that is obtained by shifting the first region in the frame 101c corresponding to the next time point $t_4$ after the time point $t_3$ which is the third time point of the frame 101b in the time series in the direction perpendicular to the moving direction of the vehicle in reverse chronological order from the frame 101b corresponding to the time point $t_3$. In the example depicted in FIG. 21, the determining unit 112A determines that the first region exists in the frames 101a to 101b through image processing.

In the above-described manner, the determining unit 112A further determines, through image processing, whether the first region indicating a person exists in each image to which the first annotation is not attached from among the plurality of images acquired by the acquiring unit 111.

Advantageous Effects

As described above, according to the second embodiment, even if the first annotation indicating the first region that does not require high-level recognition is not attached to some of a plurality of images that have been captured by an onboard camera, it can be determined autonomously whether the first region exists through image recognition by tracing the first region while reversing the plurality of images (video images). That is, even if the first annotation that is supposed to be attached to some of the plurality of images and that indicates the first region is not attached, it can be determined whether the first region exists in the some of the plurality of images through image processing. As a result, since the second annotation indicating the second region that requires high-level recognition can be attached autonomously to the plurality of images that have been captured by the onboard camera, an image processing method and the like capable of reducing the variation in the quality of training data items including the plurality of images can be implemented.

Third Embodiment

In the first embodiment, the description has been given of the case where crowdsourcing workers are caused to attach an annotation indicating an object, such as a person, visible in time-series images that have been captured by an onboard camera; however, the configuration is not limited to this one. An image processing apparatus, instead of the workers, may determine the first region representing, a person, and attach the first annotation indicating the first region to the time-series images.

This case will be described as a third embodiment below in terms of differences from the first embodiment.

Configuration of Image Processing Apparatus 10B

Figure 22:
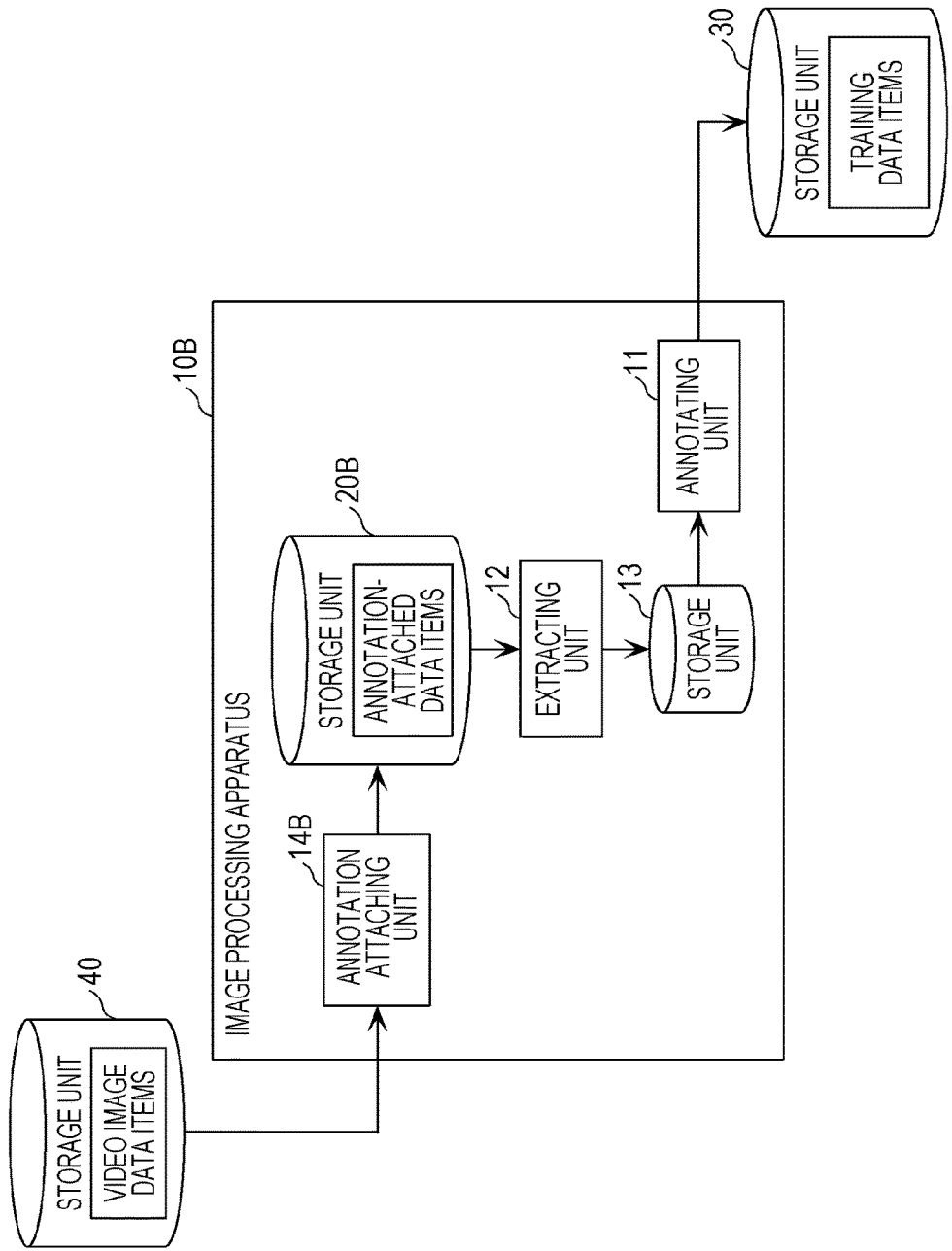
FIG. 22 is a diagram depicting an example of a functional configuration of an image processing apparatus according to a third embodiment.

FIG. 22 is a diagram depicting an example of a functional configuration of an image processing apparatus 10B according to the third embodiment. The same reference signs are assigned to the same or substantially the same components as those depicted in FIG. 1, and a detailed description is omitted.

The image processing apparatus 10B depicted in FIG. 22 differs from the image processing apparatus 10 according to the first embodiment in that the image processing apparatus 10B further includes an annotation attaching unit 14B and a storage unit 20B. Since the rest of the configuration is substantially the same as that of the image processing apparatus 10 according to the first embodiment, a description thereof is omitted.

A storage unit 40 is constituted by an HDD, a memory, or the like. The storage unit 40 stores video image data items (time-series images) that have been captured by an onboard camera.

The annotation attaching unit 14B acquires the video image data times (time-series images) that have been captured by the onboard camera and are stored in the storage unit 40. The annotation attaching unit 14B then determines the first region indicating an object, such as a person, visible in each of the acquired video image data times (time-series images) by performing image processing and attaches the first annotation indicating the first region to the video image data items (time-series images). The annotation attaching unit 14B then outputs, as annotation-attached data items to the storage unit 20B, the video image data items (time-series images) to which the first annotation has been attached.

The storage unit 20B is constituted by a HDD, a memory, or the like. The storage unit 20B stores data items (annotation-attached data items) to which the first annotation has been attached by the annotation attaching unit 14B.

Advantageous Effects

As described above, according to the third embodiment, the first region representing a person or the like, which does not require high-level recognition, can be determined autonomously (by the image processing apparatus 10B) and an annotation indicating the first region can be attached autonomously (by the image processing apparatus 10B) to video image data items (time-series images) that have been captured by an onboard camera in stead of causing crowd-sourcing workers to do so. Then, a second annotation indicating a second region that requires high-level recognition can be further attached autonomously to the plurality of images that have been captured by the onboard camera.

In this way, according to the third embodiment, the image processing method and the like capable of reducing the variation in the quality of training data items including the plurality of images can be implemented.

While the image processing method and the like according to one or a plurality of aspects of the present disclosure have been described above on the basis of the embodiments, the present disclosure is not limited to these embodiments. Embodiments obtained by applying various modifications conceivable by a person skilled in the art to the embodiments and embodiments obtained by combining elements of different embodiments may be within the scope of the one or plurality of aspects of the present disclosure as long as such embodiments do not depart from the essence of the present disclosure. For example, the following cases are also included in the present disclosure.

(1) Specifically, each of the apparatuses described above is a computer system including a microprocessor, a ROM, a random access memory (RAM), a hard disk unit, a display unit, a keyboard, and a mouse. The RAM or the hard disk unit stores a computer program. The microprocessor operates in accordance with the computer program, whereby the apparatus implements its functions. The computer program is composed of a combination of a plurality of instruction codes representing instructions given to the computer in order to implement predetermined functions.

(2) Some or all of the components of each of the apparatuses described above may be constituted by one system LSI (Large Scale Integration). A system LSI is a super multifunctional LSI produced by integrating a plurality of components on one chip. Specifically, a system LSI is a computer system including a microprocessor, a ROM, a RAM, and so forth. The RAM stores a computer program. The microprocessor operates in accordance with the computer program, whereby the system LSI implements its functions.

(3) Some or all of the components of each of the apparatuses described above may be constituted by an IC card or a discrete module detachably attached to the apparatus. The IC card or the module is a computer system including a microprocessor, a ROM, a RAM, and so forth. The IC card or the module may include the super multifunctional LSI mentioned above. The microprocessor operates in accordance with a computer program, whereby the IC card or the module implements its functions. This IC card or module may be tamper-resistant.

(4) The present disclosure may be construed as the methods described above. In addition, the present disclosure may be construed as a computer program that implements these methods by using a computer or digital signals based on the computer program.

(5) In addition, the present disclosure may be construed as a computer-readable recording medium, for example, a flexible disk, a hard disk, a CD-ROM, an MO, a digital versatile disc (DVD), a DVD-ROM, a DVD-RAM, a Blu-ray (registered trademark) (BD) disc, a semiconductor memory, or the like storing the computer program or the digital signals. In addition, the present disclosure may be construed as the digital signals stored on these recording media.

(6) In addition, the present disclosure may be construed as a configuration in which the computer program or the digital signals are transmitted via an electrical communication line, a wireless or wired communication line, a network typically the Internet, or data broadcasting, for example.

(7) In addition, the present disclosure may be construed as a computer system including a microprocessor and a memory. The memory may store the computer program, and the microprocessor may operate in accordance with the computer program.

(8) In addition, the present disclosure may be implemented such that the program or the digital signals are stored on the recording medium and transferred or the program or the digital signals are transferred via the network or the like to another independent computer system and executed thereby.

The present disclosure can be used as an image processing method, an image processing apparatus, and a recording medium storing a corresponding program. In particular, the present disclosure can be used as an image processing method, an image processing apparatus, and a recording medium storing a corresponding program for creating, without causing the variation in the quality, training data items that are used in machine learning of a hazard region where if persons approach, the persons cross in front of the vehicle and possibly collide with the vehicle.

What is claimed is:

1. A computer-implemented image processing-method, the method, utilizing one or more processors, comprising:
    acquiring, by the one or more processors, a plurality of consecutive time-series images that have been captured by an onboard camera mounted on a vehicle and to which a first annotation indicating two or more first regions is attached, the two or more first regions including at least one person region, the plurality of consecutive time-series images at least including one or more images in which the two or more first regions are located on a path of the vehicle and a distance between the two or more first regions is smaller than or equal to a threshold;
    determining, by the one or more processors, in reverse chronological order from an image corresponding to the last time point in the time series, a position of each of the two or more regions in each of the plurality of consecutive time-series images acquired in the acquiring;
    identifying, by the one or more processors, from among the plurality of consecutive time-series images, a first image corresponding to a first time point for which it has been determined for the first time in the determining that none of the two or more first regions are located on the path, and setting, as a second region, a region between the two or more first regions in the identified first image; and
    attaching, by the one or more processors, a second annotation to the first image corresponding to the first time point, the second annotation indicating the second region set in the setting.

2. The image processing method according to claim 1, wherein in the identifying and setting,
    a second image is identified in which the two or more first regions are located on the path of the vehicle and the distance between the two or more first regions is smaller than or equal to the threshold, and a region between the two or more first regions in each of a plurality of consecutive time-series images from the identified first image to the identified second image is set as the second region.

3. The image processing method according to claim 1, further comprising:
performing a first extracting process of selecting, from among all of consecutive time-series images that have been captured by the onboard camera mounted on the vehicle and that are associated with information representing braking force or acceleration of the vehicle, first extracted images that are a plurality of images up to a time point preceding, by a predetermined period, a time point at which the braking force or acceleration of the vehicle is larger than a threshold; and
performing a second extracting process of selecting the plurality of consecutive time-series images from among the first extracted images selected through the first extracting process.

4. The image processing method according to claim 3, further comprising:
causing crowdsourcing workers to attach, to each of the all of the consecutive time-series images, the first annotation indicating the first region existing in the image prior to the first extracting process.

5. The image processing method according to claim 4, further comprising:
causing crowdsourcing workers to attach, to each of the first extracted images selected through the first extracting process, the first annotation indicating the first region existing in the first extracted image prior to the second extracting process.

6. The image processing method according to claim 1, wherein each of the two or more first regions is a person region representing a person.

7. The image processing method according to claim 1, wherein the two or more first regions include a person region representing a person and a vehicle region representing a stationary vehicle.

8. The image processing method according to claim 1, wherein the second region is a hazard region in which, when objects represented by the two or more first regions approach, at least one of the objects crosses in front of the vehicle and possibly collides with the vehicle, and
wherein the image processing method further comprises:
adding, to the second annotation attached in the attaching, a hazard level that increases as an area of the second region decreases.

9. The image processing method according to claim 1, wherein the second region is a hazard region in which, when objects represented by the two or more first regions approach, at least one of the objects crosses in front of the vehicle and possibly collides with the vehicle, and
wherein the image processing method further comprises:
adding, to the second annotation attached in the attaching, different hazard levels for a first sub-region and a second sub-region that constitute the second region, the hazard level for one of the first sub-region and the second sub-region that is closer to one of the two first regions having the second region interposed therebetween and involving a larger amount of movement being higher than the hazard level for the other of the first sub-region and the second sub-region.

10. The image processing method according to claim 1, wherein the determining includes performing a first determining process of determining, in reverse chronological order from the image corresponding to the last time point in the time series, the first image corresponding to a third time point to which the first annotation is not attached from among the plurality of consecutive time-series images acquired in the acquiring, and
performing a second determining process of determining, through image processing, whether the first region exists at a position in each of the images that is obtained by shifting the first region in an image corresponding to the next time point after the third time point of the first image that has been determined through the first determining process in a direction perpendicular to a direction in which the vehicle moves in reverse chronological order from the image corresponding to the third time point.

11. An image processing apparatus comprising one or more processors configured to:
acquire a plurality of consecutive time-series images that have been captured by an onboard camera mounted on a vehicle and to which a first annotation indicating two or more first regions is attached, the two or more first regions including at least one person region, the plurality of consecutive time-series images at least including one or more images in which the two or more first regions are located on a path of the vehicle and a distance between the two or more first regions is smaller than or equal to a threshold;
determine, in reverse chronological order from an image corresponding to the last time point in the time series, a position of each of the two or more regions in each of the plurality of acquired consecutive time-series images;
identify, from among the plurality of consecutive time-series images, a first image corresponding to a first time point for which it has been determined for the first time that none of the two or more first regions are located on the path, and sets, as a second region, a region between the two or more first regions in the identified first image; and
attach a second annotation to the first image corresponding to the first time point, the second annotation indicating the set second region set.

12. A non-transitory computer-readable recording medium storing a program thereon, the program causing a computer to execute:
acquiring a plurality of consecutive time-series images that have been captured by an onboard camera mounted on a vehicle and to which a first annotation indicating two or more first regions is attached, the two or more first regions including at least one person region, the plurality of consecutive time-series images at least including one or more images in which the two or more first regions are located on a path of the vehicle and a distance between the two or more first regions is smaller than or equal to a threshold;
determining, in reverse chronological order from an image corresponding to the last time point in the time series, a position of each of the two or more regions in each of the plurality of consecutive time-series images acquired in the acquiring;
identifying, from among the plurality of consecutive time-series images, a first image corresponding to a first time point for which it has been determined for the first time in the determining that none of the two or more first regions are located on the path, and setting, as a second region, a region between the two or more first regions in the identified first image; and attaching a second annotation to the first image corresponding to the first time point, the second annotation indicating the second region set in the setting.

13. The method according to claim 1, further comprising: autonomously attaching, by the one or more processors, to the second annotation attached in the attaching, another annotation that requires a higher level of recognition compared to the first annotation.

14. The method according to claim 1, further comprising: autonomously attaching, by the one or more processors, the first region that does not require a higher level of recognition to the plurality of time-series images that have been captured by the onboard video camera; and autonomously attaching, by the one or more processors, the second region that requires a higher level of recognition to the plurality of time-series images that have been captured by the onboard video camera.

* * * * *